United States Patent
Hu

(10) Patent No.: US 11,391,955 B2
(45) Date of Patent: Jul. 19, 2022

(54) DISPLAY DEVICES FOR DISPLAYING HOLOGRAMS

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

(21) Appl. No.: 17/581,945

(22) Filed: Jan. 23, 2022

(65) Prior Publication Data

US 2022/0146835 A1 May 12, 2022

Related U.S. Application Data

(63) Continuation-in-part of application No. 17/315,302, filed on May 8, 2021, now Pat. No. 11,231,589, which is a continuation-in-part of application No. 15/996,518, filed on Jun. 3, 2018, now Pat. No. 11,002,967, which is a continuation-in-part of application No. 15/944,691, filed on Apr. 3, 2018, now abandoned, which is a continuation of application No. 15/372,957, filed on Dec. 8, 2016, now Pat. No. 9,946,075.

(51) Int. Cl.
| | |
|---|---|
| *G02B 27/01* | (2006.01) |
| *G02B 27/00* | (2006.01) |
| *F21V 8/00* | (2006.01) |
| *G06F 3/01* | (2006.01) |
| *G02B 6/44* | (2006.01) |
| *G02B 6/42* | (2006.01) |
| *G06F 1/16* | (2006.01) |
| *G02B 3/14* | (2006.01) |

(52) U.S. Cl.
CPC ......... *G02B 27/0172* (2013.01); *G02B 6/003* (2013.01); *G02B 6/0006* (2013.01); *G02B 6/0008* (2013.01); *G02B 6/0035* (2013.01); *G02B 6/4204* (2013.01); *G02B 6/443* (2013.01); *G02B 6/4471* (2013.01); *G02B 27/0093* (2013.01); *G06F 1/163* (2013.01); *G06F 3/011* (2013.01); *G06F 3/013* (2013.01); *G02B 3/14* (2013.01); *G02B 2027/011* (2013.01); *G02B 2027/014* (2013.01); *G02B 2027/0125* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 2011/0199582 A1* | 8/2011 | Kuriki | H04N 9/3129 353/31 |
| 2013/0242555 A1* | 9/2013 | Mukawa | G02B 27/0172 362/237 |

(Continued)

*Primary Examiner* — Krishna P Neupane
(74) *Attorney, Agent, or Firm* — Joe Zheng

(57) ABSTRACT

Techniques for displaying holograms in wearable display devices are described. An image source projects holographic images sequentially in three primary colors into a waveguide, where the images are modulated in amplitude and phase in spatial light modulator (SLM). Depending on implementation, the image source may be located next to the waveguide or an end of optical fibers, where the optical fibers are provided to transport the holographic images near the waveguide for projection thereof into the waveguide.

20 Claims, 34 Drawing Sheets

(56) References Cited

U.S. PATENT DOCUMENTS

| | | | |
|---|---|---|---|
| 2014/0333734 A1* | 11/2014 | Yang | G02B 6/06 |
| | | | 348/53 |
| 2016/0025984 A1* | 1/2016 | Hino | G02B 27/0172 |
| | | | 345/8 |
| 2017/0227776 A1* | 8/2017 | Yokoyama | G02B 26/0833 |
| 2019/0286055 A1* | 9/2019 | Hu | G02F 1/13 |

* cited by examiner

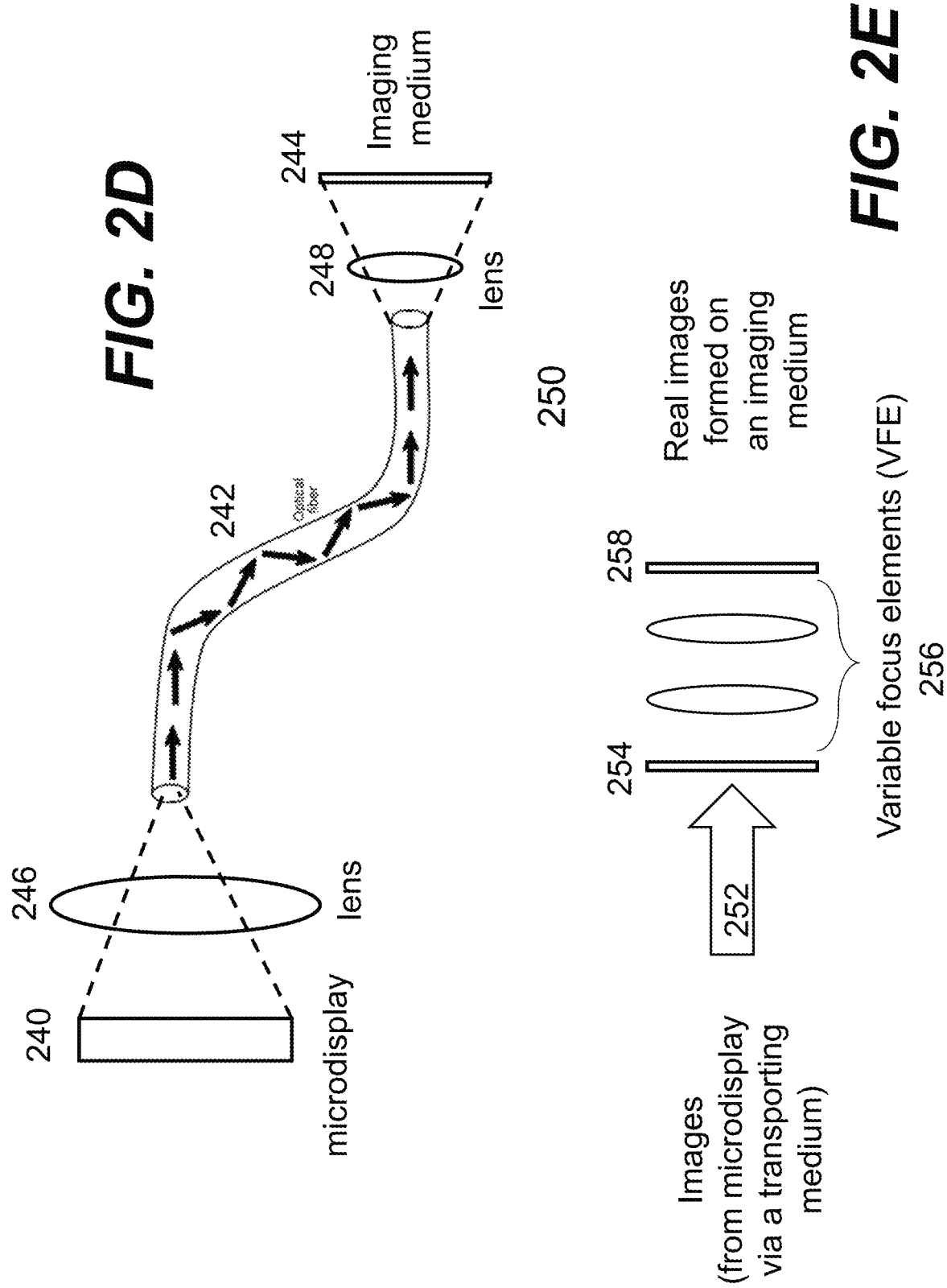

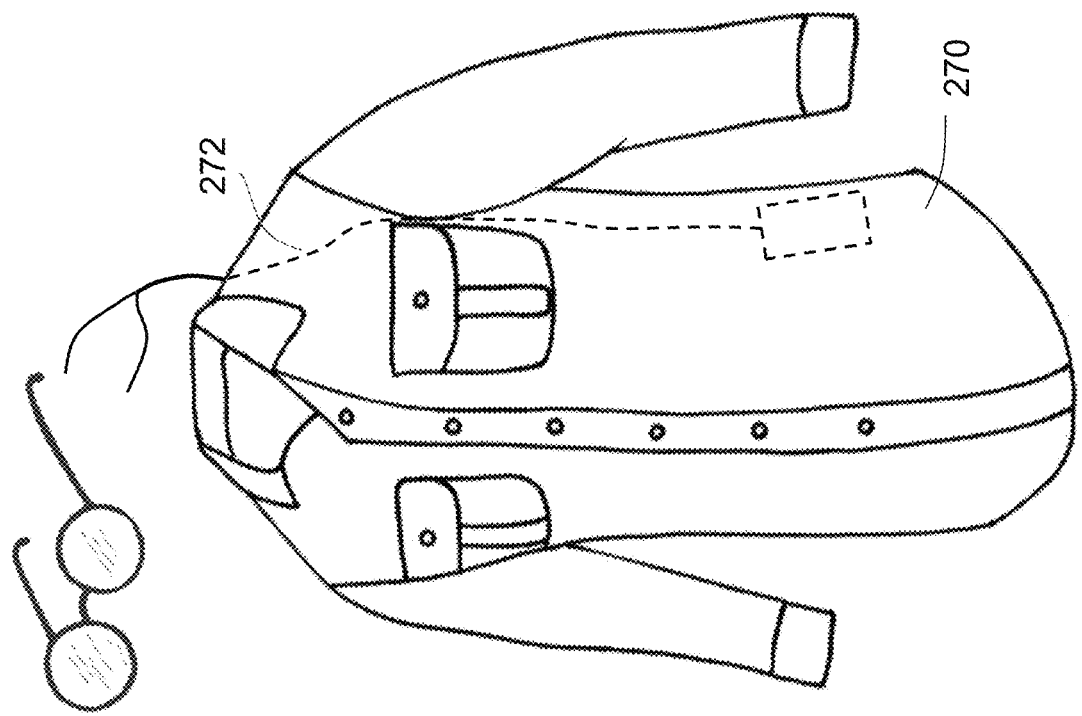

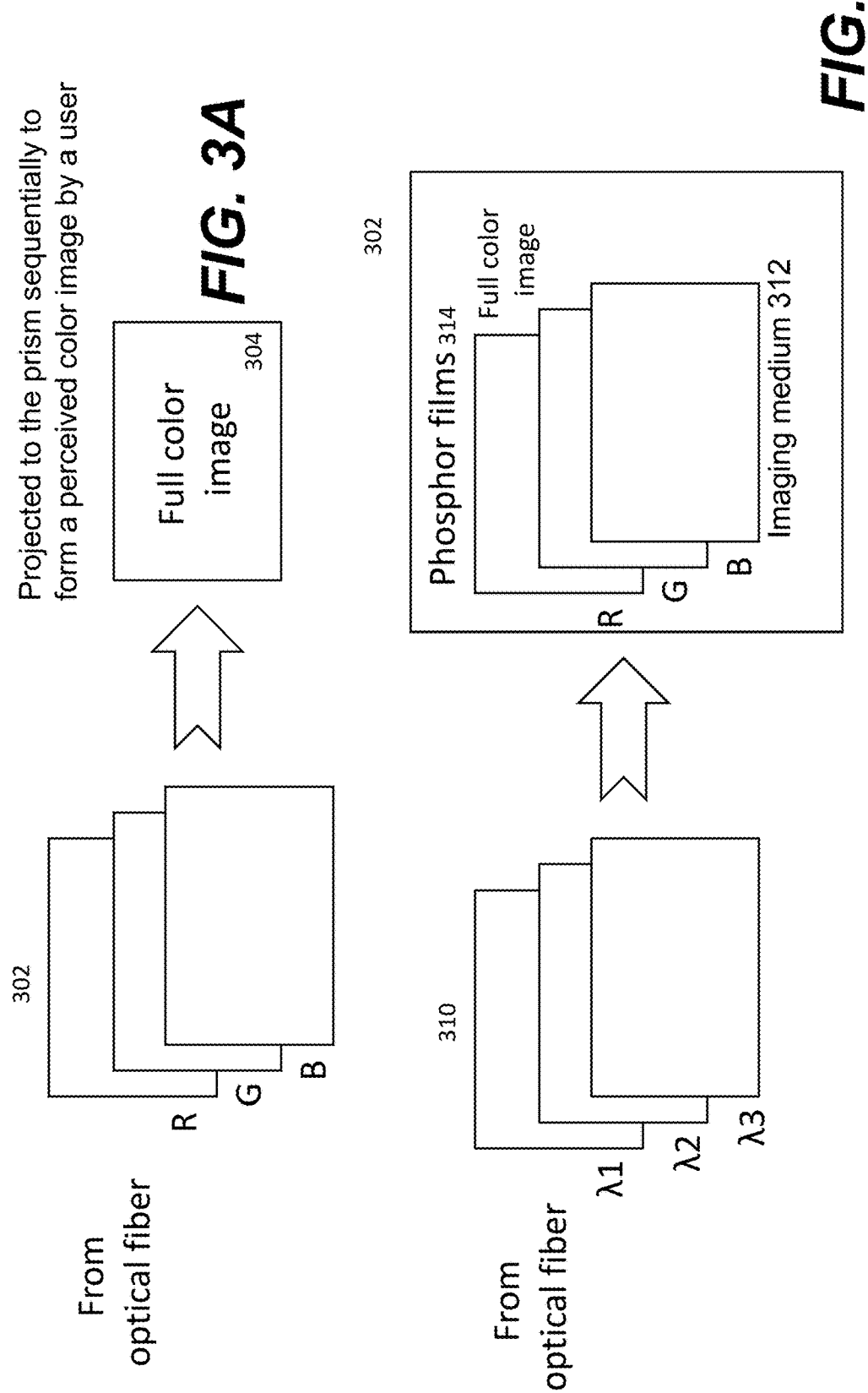

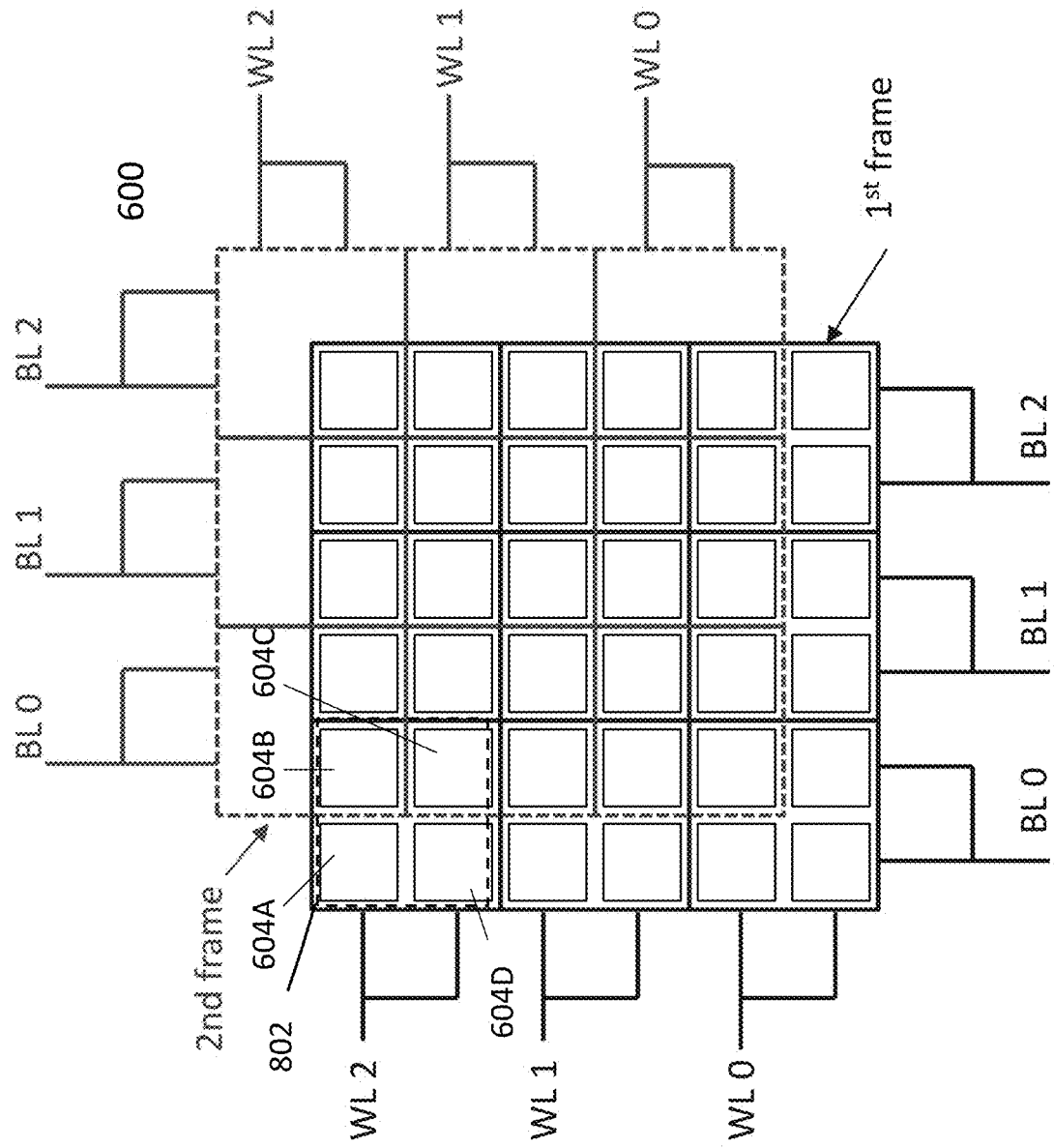

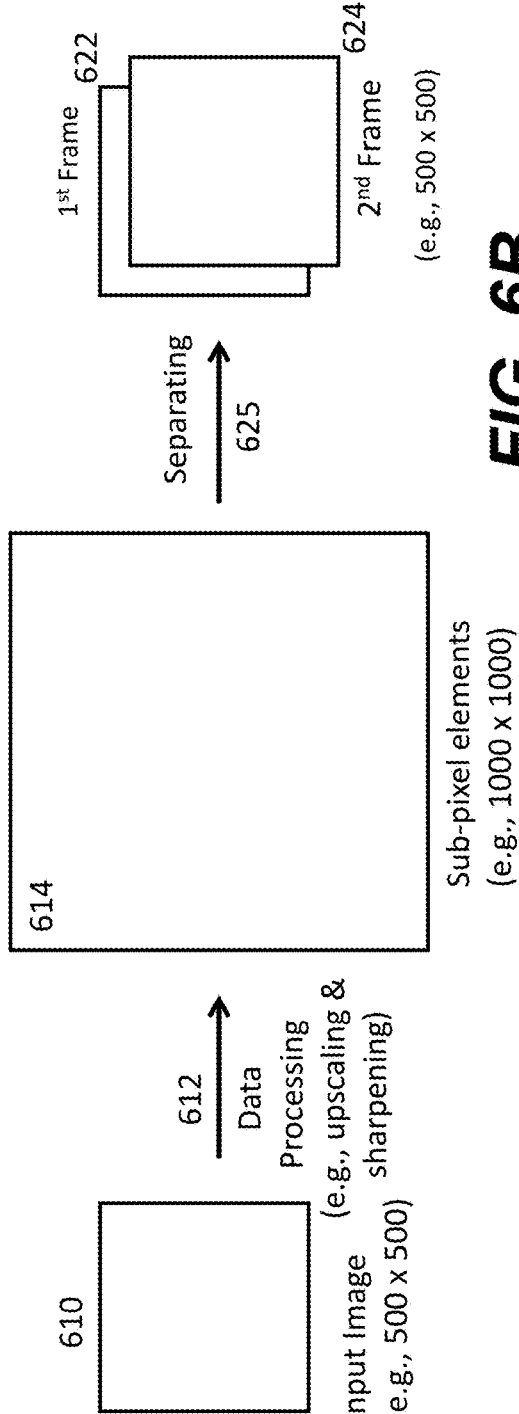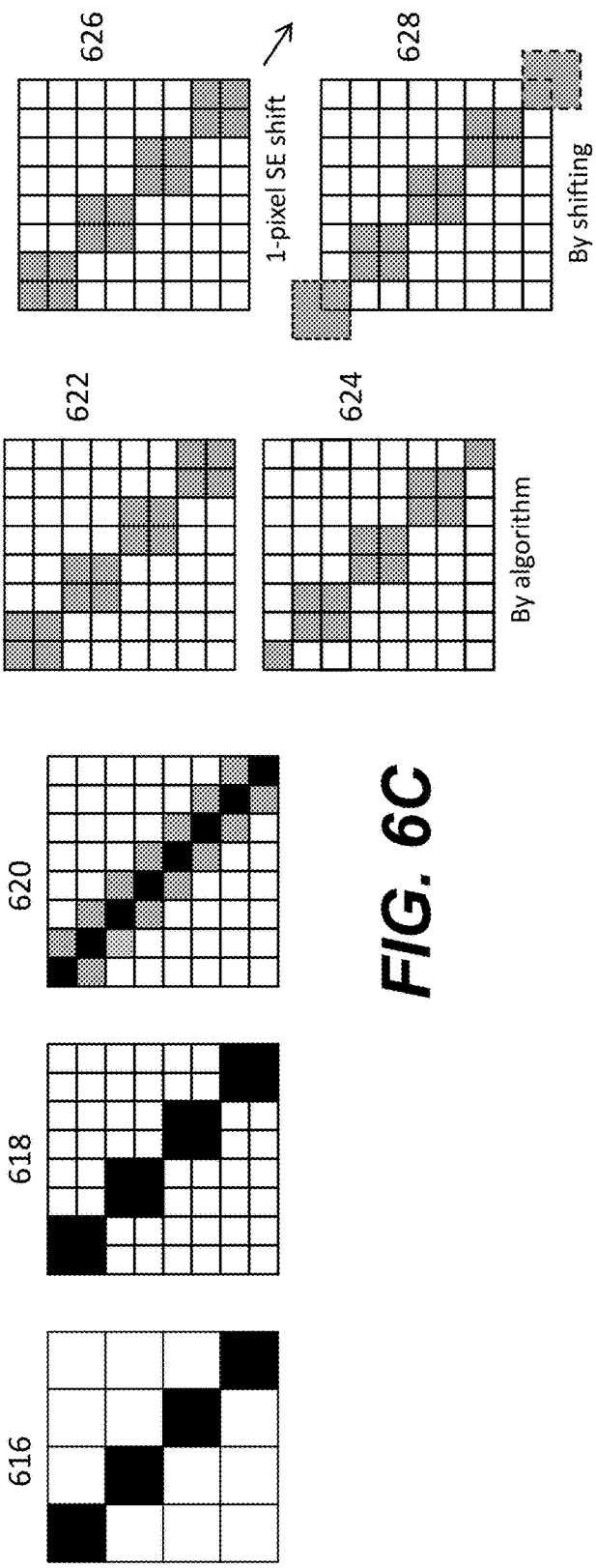
FIG. 6B
FIG. 6C

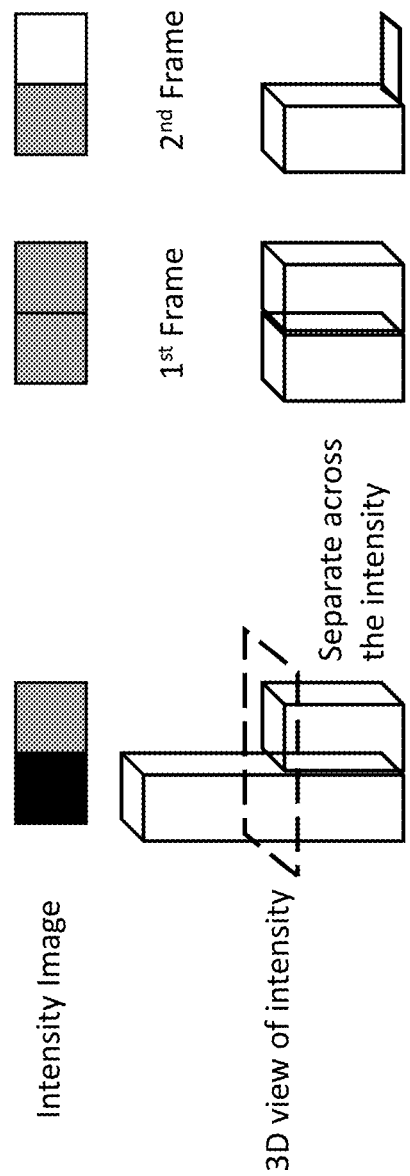

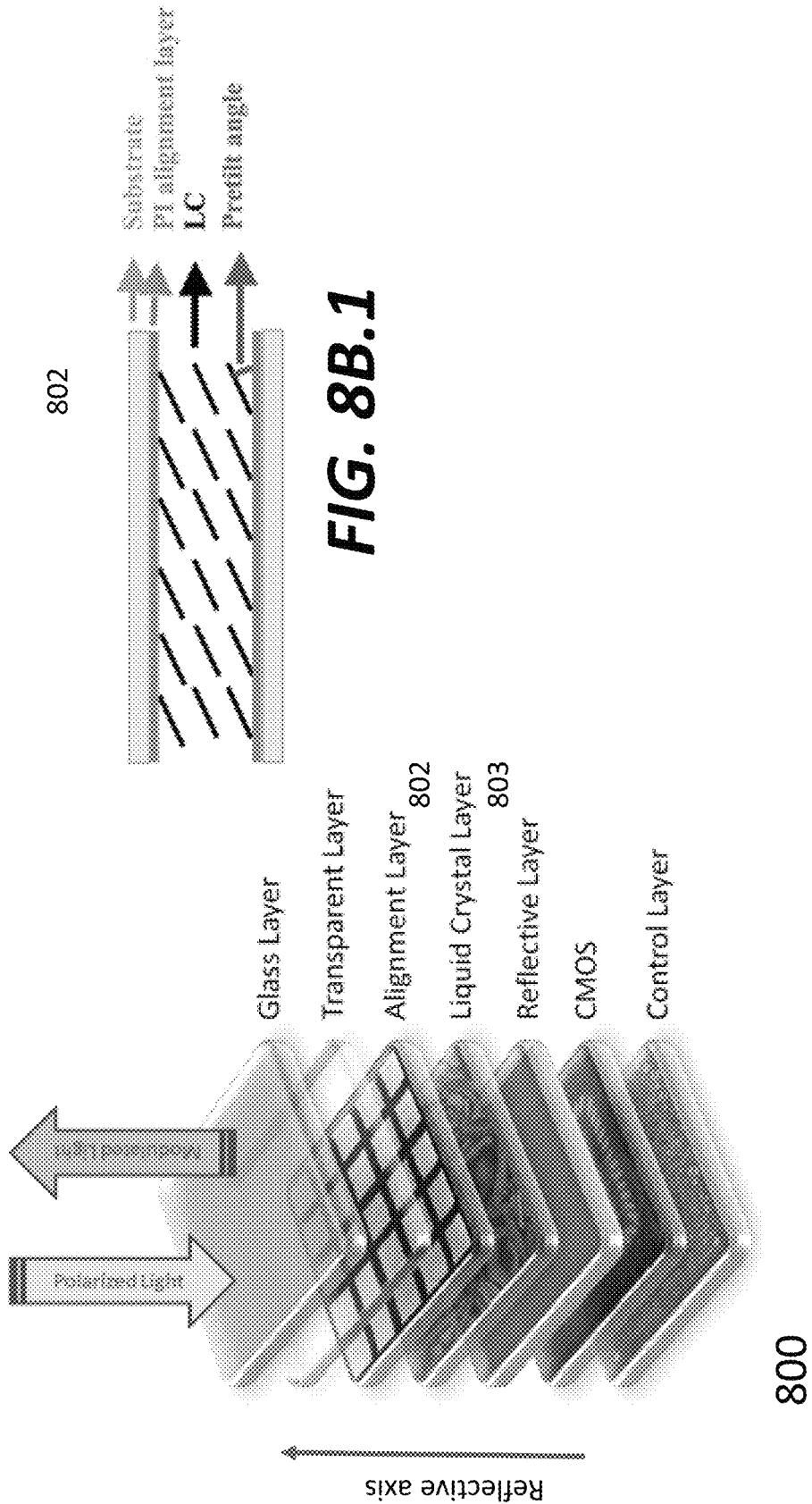

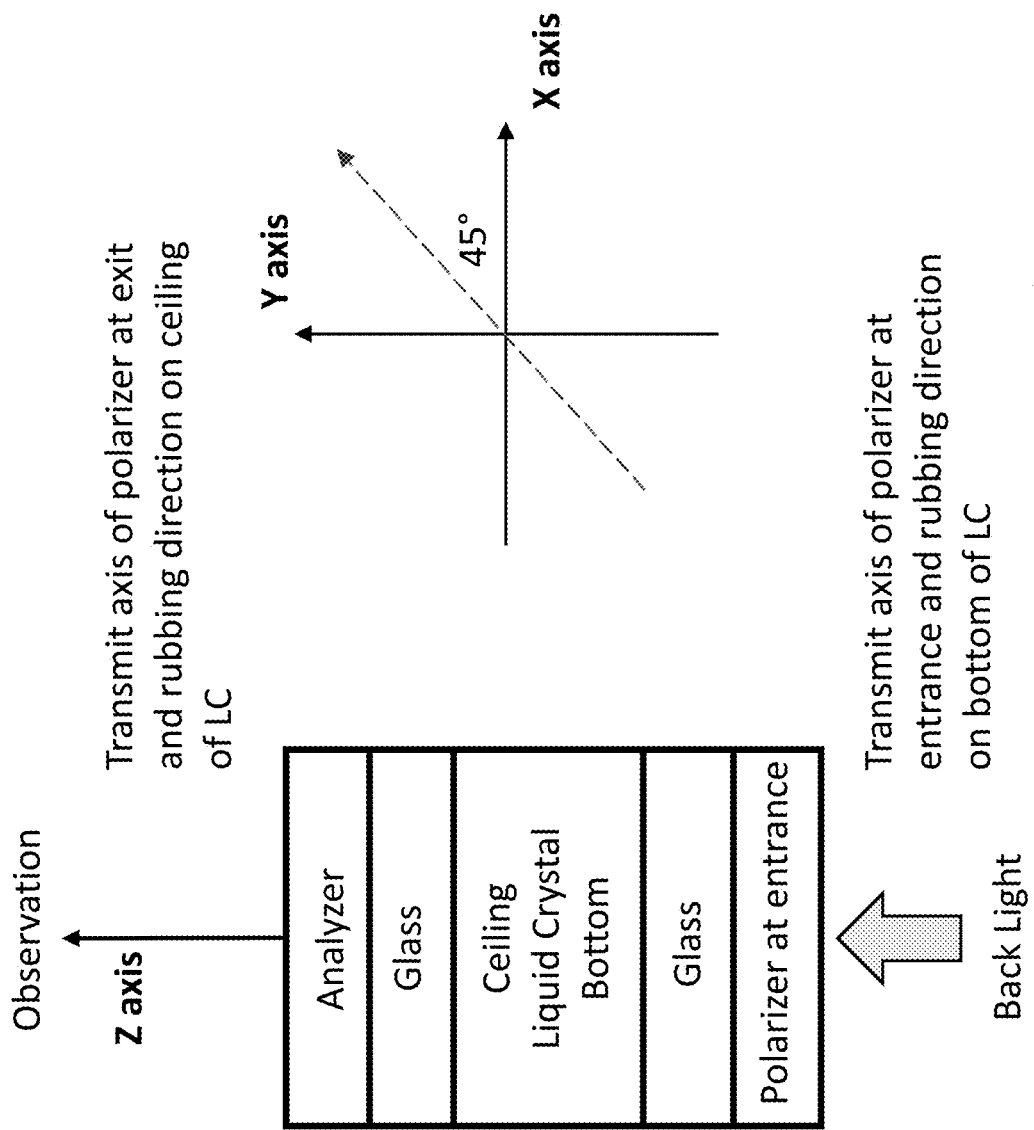
FIG. 8B.2

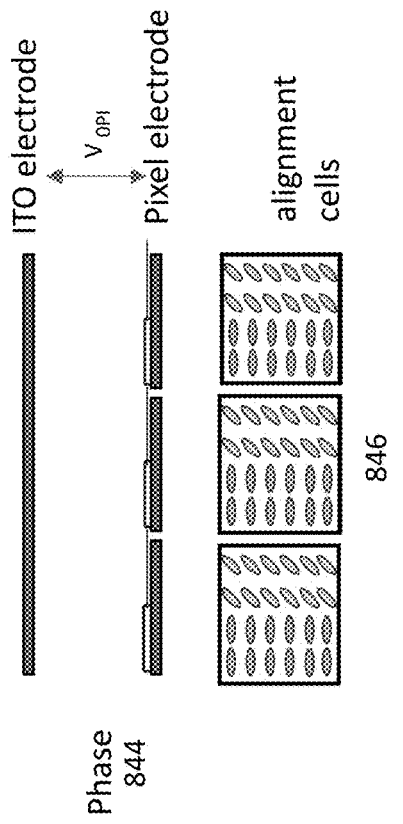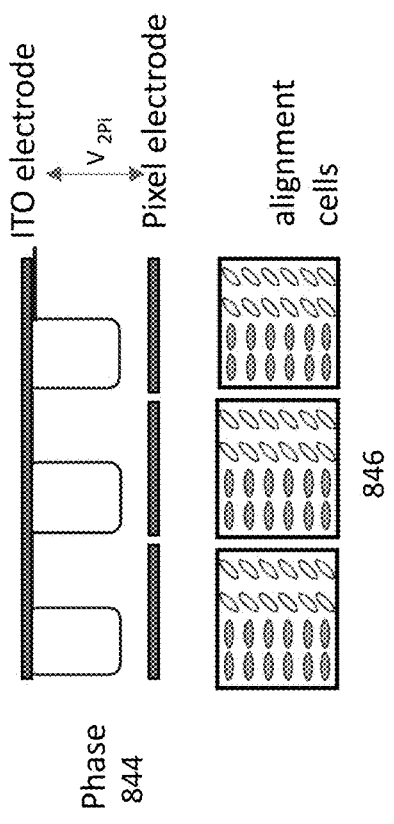
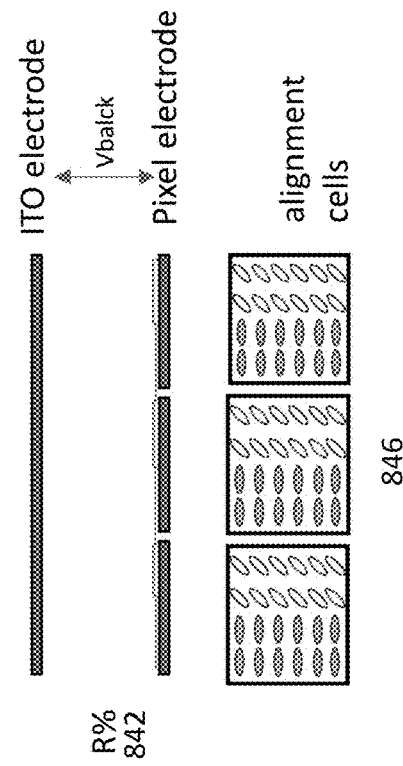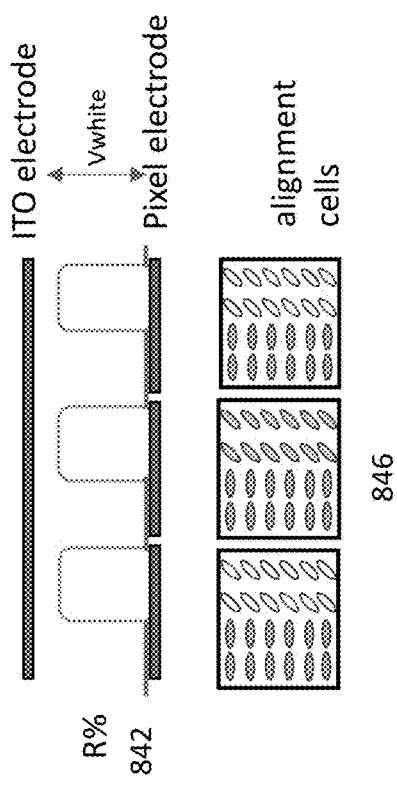
FIG. 8F

One pixel=6.4um, with 3.2um(half pixel) implement different photo alignment angle treatment

DISPLAY DEVICES FOR DISPLAYING HOLOGRAMS

BACKGROUND OF THE INVENTION

Field of the Invention

The present invention generally relates to the area of display devices and particularly relates to architecture and designs of display devices, where a display device is made in form of a pair of glasses, and may be used in various applications including virtual reality and augmented reality. More particularly, the present invention employs amplitude modulations (AM) and phase modulations (PM) to realize holographic images for display, for example, in wearable display devices.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (>1.2 lbs). With the weight, a wearer won't feel comfortable when wearing it for a period. Indeed, what is available in the market is generally heavy and bulky in comparison to normal glasses (25 g-100 g). It is reported that the wearable devices based on HoleLens will be supplied to US army. If ever equipped on soldiers, the weight of the wearable device may potentially impact the movements of the soldiers that have to move swiftly in battlefields. Thus there is still another need for a wearable ARNR viewing or display device that looks similar to a pair of regular glasses but is also amenable to smaller footprint, enhanced impact performance, lower cost packaging, and easier manufacturing process.

Wearable display devices provide relatively an ideal viewing environment to view holograms as they are often placed near eyes and may block a considerable amount of ambient lights. Thus there is still another need for solutions of generating holograms for projecting onto a medium, such as transparent lenses, in a wearable display device.

Many glasses-like display devices employ a common design of positioning image forming components (such as LCOS) near the front or lens frames, hoping to reduce transmission loss of images and use less components. However, such a design often makes a glasses-like display device unbalanced, the front part is much heavier than the rear part of the glasses-like display device, adding some pressure on a nose. There is thus still another need to distribute the weight of such a display device when worn on a user.

Regardless how a wearable display device is designed, there are many components, wires and even batteries that must be used to make the display device function and operable. While there have been great efforts to move as many parts as possible to an attachable device or enclosure to drive the display device from a user's waist or pocket, the essential parts, such as copper wires, must be used to transmit various control signals and image data. The wires, often in form of a cable, do have a weight, which adds a pressure on a wearer when wearing such a display device. There is yet another need for a transmission medium that can be as light as possible without sacrificing the needed functions.

There are many other needs that are not to be listed individually but can be readily appreciated by those skilled in the art that these needs are clearly met by one or more embodiments of the present invention detailed herein.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of wearable devices that may be for virtual reality and augmented reality applications. According to one aspect of the present invention, a display device is made in form of a pair of glasses and includes a minimum number of parts to reduce the complexity and weight thereof. A separate case or enclosure is provided as portable to be affixed or attached to a user (e.g., a pocket or waist belt). The enclosure includes all necessary parts and circuits to generate content for virtual reality and augmented reality applications, resulting in a minimum number of parts needed on the glasses, hence smaller footprint, enhanced impact performance, lower cost packaging, and easier manufacturing process of the glasses. The content is optically picked up by an optical cable and transported by optical fibers in the optical cable to the glasses, where the content is projected respectively to the lenses specially made for displaying the content before the eyes of the wearer.

According to another aspect of the present invention, the glasses include no electronic components and are coupled to the enclosure by a transmission line including only one or more the optical fibers (interchangeably referred to as fiber or fibers hereinafter), where the fiber is responsible for transporting the content or an optical image from one end of the optical fiber to another end thereof by total internal reflections within the fiber. The optical image is picked up by a focal lens from a microdisplay in the enclosure.

According to still another aspect of the present invention, the optical image is in lower resolution but received by the optical fiber at a twice speed as the normal refresh rate (e.g., 120 Hz vs. 60 Hz). Two successive images in lower resolution are combined at or near the other end of the optical fiber to generate a combined image at higher resolution, where the combined is refreshed at the normal refresh rate.

According to still another aspect of the present invention, each of the lenses includes a prism in a form that propagates an optical image being projected onto one edge of the prism to an optical path that a user or wearer of the glasses can see an image formed in the lenses per the optical image. The prism is also integrated with or stacked on an optical correcting lens that is complementary or reciprocal to that of the prism to form an integrated lens for the glasses. The optical correcting lens is provided to correct an optical path from the prism to allow the user to see through the integrated lens without optical distortions.

According to still another aspect of the present invention, one exemplary the prism is a waveguide. Each of the integrated lenses includes an optical waveguide that propagates an optical image being projected onto one end of the waveguide to another end with an optical path that a user can see an image formed per the optical image. The waveguide may also be integrated with or stacked on an optical correcting lens to form an integrated lens for the glasses.

According to still another aspect of the present invention, the integrated lens may be further coated with one for more films with optical characteristics that amplify the optical image before the eyes of the user.

According to still another aspect of the present invention, the glasses may include optionally a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

According to still another aspect of the present invention, an optical conduit is used to transport an optical image received from an image source (e.g., a microdisplay). The optical conduit is encapsulated in or integrated with a temple of the display device. Depending on implementation, the optical conduit comprising a bundle or an array of optical fibers may be twisted, thinned or otherwise deformed to fit with a stylish design of the temple while transporting an optical image from one end to another end of the temple.

According to still another aspect of the present invention, the optical image is a holographic image/video (hologram). The hologram is generated by phase modulating as well as amplitude modulating reflected images from a Spatial light modulation (SLM) device. Depending on implementation, the hologram may be generated near an integrated lens, an end of a temple or transported in via optical fibers from an external device.

According to one aspect of the present invention, light propagation (e.g., from an SLM) is controlled in two different directions (e.g., 45 and 0 degrees) to perform both amplitude modulation (AM) and phase modulation (PM) at the same time in liquid crystals. According to another aspect of the present invention, a mask is used to form an array of embossed microstructures or a pattern, where the pattern includes an array of alignment cells, a first group of the cells are aligned in the first direction and a second group of the cells are aligned in the second direction. Depending on applications, two cells from the first group and the second group may correspond to a single pixel or two neighboring pixels, resulting in amplitude modulation and phase modulation within the pixel or within an array of pixels.

According to yet another aspect of the present invention, a portable device may be used to house the SLM to perform the AM and PM and provide a hologram for transportation via optical fibers. Depending on implementation, the portable device may be implemented as a standalone device or a docking unit to receive a smartphone. The portable device is primarily a control box that is connected to a network (e.g., the Internet) and generates control and instruction signals when controlled by a user. Many functions provided in the smartphone may be used, such as the network interface and touch screen to receive inputs from the user.

The present invention may be implemented as an apparatus, a method, a part of system. Different implementations may yield different benefits, objects and advantages. In one embodiment, the present invention is a display device comprising: an eyeglasses frame to accommodate at least one integrated lens including a light waveguide, at least one temple attached to the eyeglasses frame; and an image source providing a hologram into an edge of the waveguide, wherein the hologram is seen in the integrated lens by a user wearing the display device. The display device further includes a set of optical fibers having a first end and a second end, the first end receiving a sequence of optical images projected thereon from a lens deposed before the second end, wherein the optical images are sequentially transported to the second end by total internal reflection within the optical fibers, wherein no other power-driven electronic components are needed in the display device to receive the optical images and deliver the optical images to the integrated lens. The light source includes a spatial light modulation (SLM) device provided to modulate an optical image in both amplitude and phase. The optical fibers are deposed along the temple, wherein the SLM device includes a microdisplay shined by a uniform laser light sheet.

In another embodiment, the present invention is a method for a display device, the method comprises: providing an eyeglasses frame including at least one integrated lens and one temple attached to the eyeglasses frame, wherein the integrated lens further includes a light waveguide; and projecting a hologram from an image source onto an edge of the waveguide, wherein the hologram is subsequently seen in the integrated lens by a user wearing the display device, wherein the light source includes a spatial light modulation (SLM) device.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2D shows how an image is being transported from a microdisplay via a fiber cable to an imaging medium;

FIG. 2E shows a set of exemplary variable focus elements (VFE) to accommodate an adjustment of the projection of an image onto an optical object (e.g., an imaging medium or a prism);

FIG. 2I shows a shirt in which a cable is enclosed within the shirt or attached thereto;

FIG. 3A shows how three single color images are being combined visually and perceived as a full color image by human vision;

FIG. 3B shows that three different color images are generated under three lights respectively at wavelengths A1, A2, and A3, the imaging medium includes three films, each coated with a type of phosphor.

FIG. 6A shows an array of pixel elements, as an example, each of the pixel elements is shown to have four sub-image elements;

FIG. 6B shows a concept of producing an expanded image from which two frames are generated;

FIG. 6C shows an example of an image expanded to an image of double size in the sub-pixel elements by writing a pixel value into a group of all (four) sub-pixel elements, where the expanded is processed and separated into two frames via two approaches;

FIG. 6D illustrates what it is means by separating an image across its intensities to produce two frames of equal size to the original image;

FIG. 8A shows an exemplary LCoS structure producing 2-dimentional optical image (i.e., 2D varying intensities of light or modulated light to get gray levels of images);

FIG. 8B.1 shows an exemplary cross view of an LC layer with the alignment layer, where the alignment (rubbing) angle dictates the characteristics of light going through the LC molecules;

FIG. 8B.2 shows functional layers in an exemplary LCoS

FIG. 8F shows two separate illustration curves, one being a reflectance curve as AM and the other being the phase curve as PM;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-8J. However, those skilled in the art will readily appreciate that the detailed description given herein with respect to these figures is for explanatory purposes as the invention extends beyond these limited embodiments.

Figure 1A:
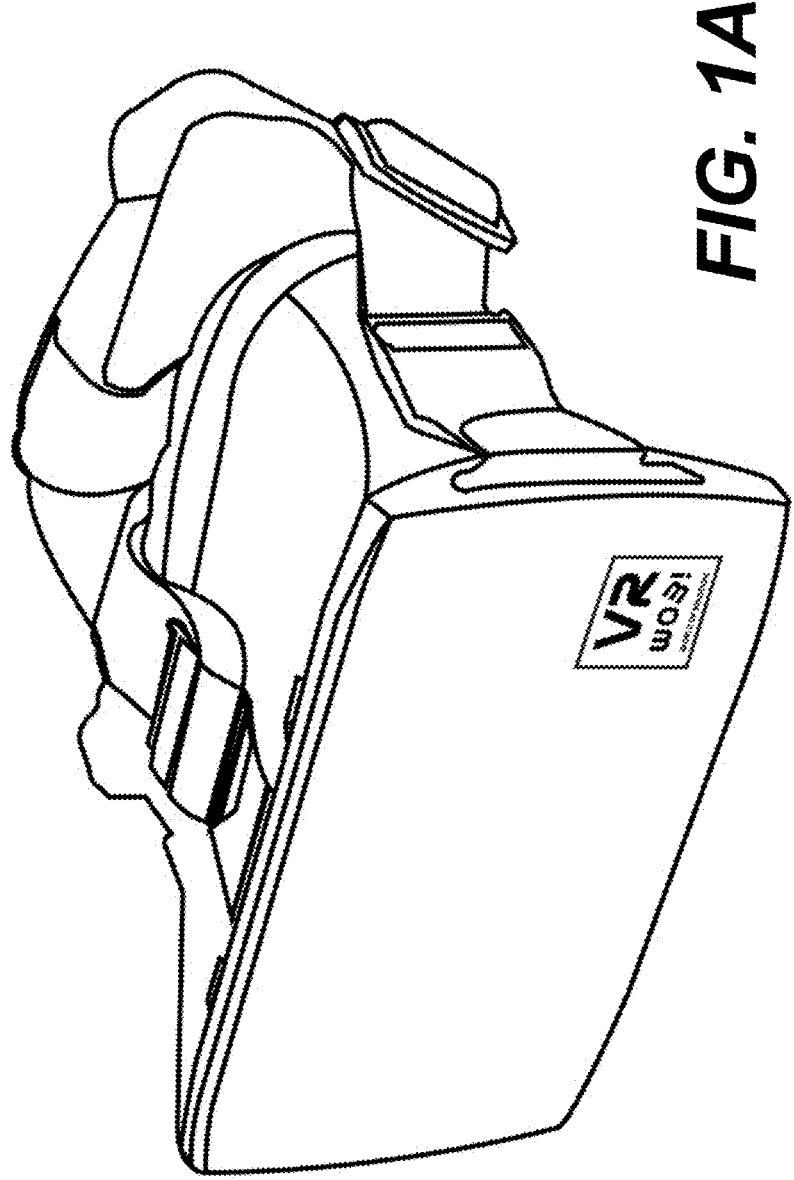
FIG. 1A shows an exemplary goggle now commonly seen in the market for the application of delivering or displaying VR/AR.
Figure 1B:
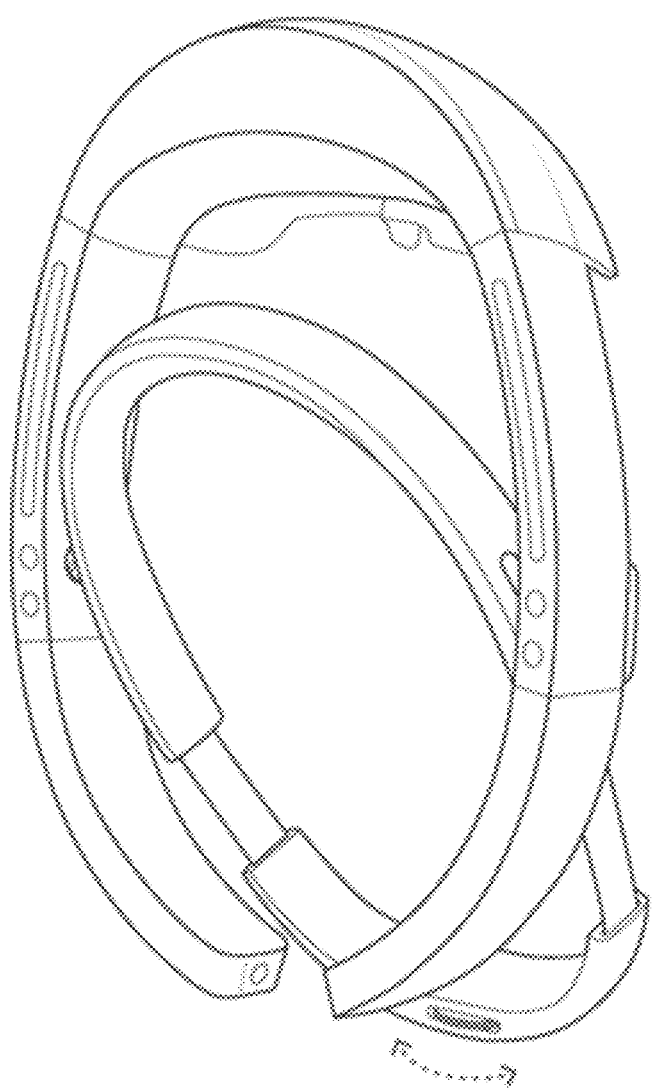
FIG. 1B shows a sketch of HoloLens from Microsoft.
Figure 2A:
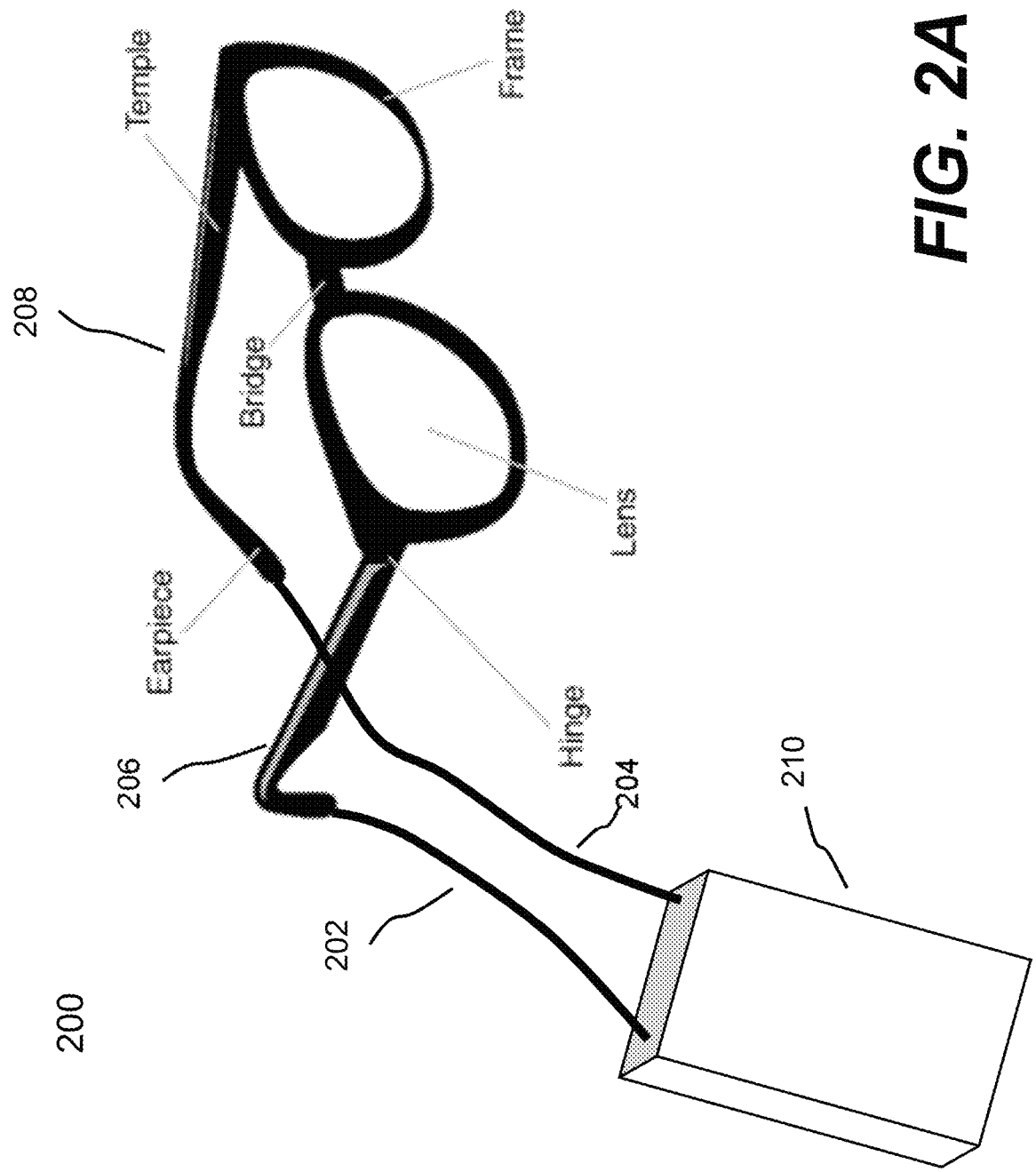
FIG. 2A shows a pair of exemplary glasses that can be used for the application of VR or AR or both according to one embodiment of the present invention.

Referring now to the drawings, in which like numerals refer to like parts throughout the several views. FIG. 2A shows a pair of exemplary glasses 200 that are used for applications of VR/AR according to one embodiment of the present invention. The glasses 200 appear no significant difference to a pair of normal glasses but include two flexible cables 202 and 204 that are respectively extended from the temples 206 and 208. According to one embodiment, each pair of the two flexible cables 202 and the temples 206 and 208 are integrated or removably connected at one end thereof and include one or more optical fibers.

Both of flexible cables 202 are coupled at another end thereof to a portable computing device 210, where the computing device 210 or external box 210 includes necessary components to generate image data to drive a microdisplay, where electronic images are displayed on the microdisplay. The displayed images are optically captured and projected onto one end of the cables 202. The optical images are transported through the optical fibers in the flexible cables 202 by the total internal reflections therein all the way to another end of the optical fibers, where the optical images are projected onto the lenses in the glasses 200. As will be further described, the optical images can be holograms according to one embodiment of the present invention.

Figure 2B:
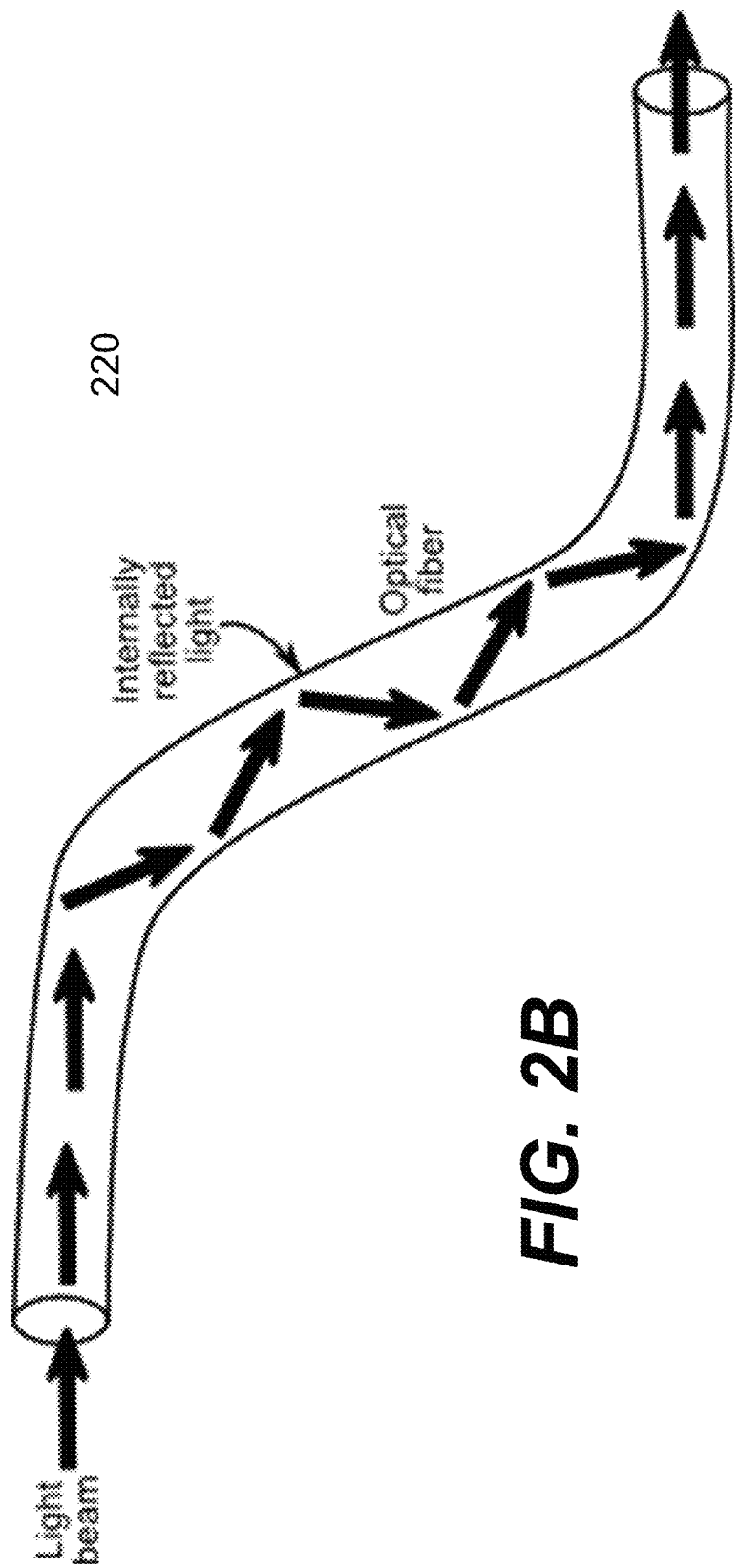
FIG. 2B illustrates that an optical fiber is used to transmit light from one place to the other along curved path in a more effective manner or by total internal reflections within the fiber.

According to one embodiment, each of the two flexible cables 202 includes one or more optical fibers. Optical fibers are used to transmit light from one place to the other along curved path in a more effective manner as shown in FIG. 2B. In one embodiment, the optical fibers are formed with thousands of strands of a very fine quality glass or quartz of refractive index about 1.7 or so. The thickness of a strand is tiny. The strands are coated with a layer of some material of lower refractive index. The ends of the strands are polished and clamped firmly after aligning them carefully. When light is incident at a small angle at one end, it gets refracted into the strands (or fibers) and gets incident on the interface of the fibers and the coating. The angle of incidence being greater than the critical angle, the ray of light undergoes total internal reflections and essentially transports the light from one end to another end even if the fiber is bent. Depending on the implementation of the present invention, a single fiber or a plurality of fibers arranged in parallel may be used to transport an optical image projected onto one end of the fiber or fibers to another end thereof. In general, a high-resolution image would require more fibers to transmit through. As will be further described below according to one embodiment, the number of fibers in use is minimized by transmitting images in first (low) resolution, resulting in a fewer number of fibers. Two of these images (e.g., two successive images) are combined after the transmission through the fibers by refreshing these two images at a double rate to generate a perceived image second (high) resolution.

Figure 2C:
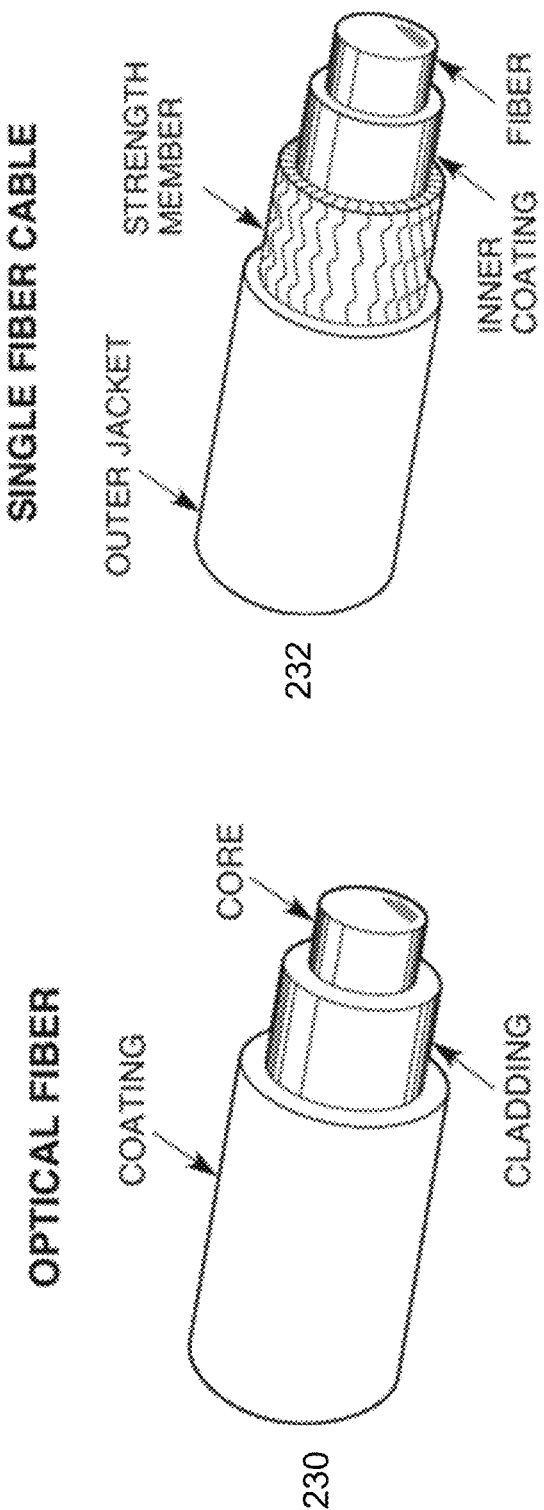
FIG. 2C shows two exemplary ways to encapsulate a fiber or a plurality of fibers according to one embodiment of the present invention.

FIG. 2C shows two exemplary ways 230 or 232 to encapsulate a fiber or a plurality of fibers according to one embodiment of the present invention. The encapsulated fiber or fibers may be used as the cable 202 or 204 in FIG. 2A and extended through each of the non-flexible temples 206 and 208 all the way to the end thereof. According to one embodiment, the temples 206 and 208 are made of a type of material (e.g., plastic or metal) commonly seen in a pair of regular glasses, a portion of the cable 202 or 204 is embedded or integrated in the temple 206 or 208, resulting in a non-flexible part while another portion of the cable 202 or 204 remains flexible. According to another embodiment, the non-flexible part and the flexible part of the cable 202 or 204 may be removably connected via a type of interface or connector.

Referring now to FIG. 2D, it shows how an image is being transported from a microdisplay 240 via a fiber cable 242 to an imaging medium 244. As will be further described below, an imaging medium 244 may be a physical thing (e.g., film or lens) or non-physical thing (e.g., the air). A microdisplay is a display that has a very small screen (e.g., far less than an inch). This type of tiny electronic display system was introduced commercially in the late 1990s. The most common applications of microdisplays include rear-projection TVs and head-mounted displays. Microdisplays may be reflective or transmissive depending upon the way light is allowed to pass through the display unit. Through a lens 246, an image (not shown) displayed on the microdisplay 240 is picked up by one end of the fiber cable 242 that transports the image to the other end of the fiber cable 242. Another lens 248 is provided to collect the image from the fiber cable 242 and projects it onto the imaging medium 244. Depending on the implementation, there are different types of microdisplays and imaging mediums. Some of the embodiments of the microdisplays and imaging mediums will be described in detail below.

FIG. 2E shows a set of exemplary variable focus elements (VFE) 250 to accommodate an adjustment of the projection of an optical image onto an optical object (e.g., an imaging medium, a prism or a lens). To facilitate the description of various embodiments of the present invention, it is assumed that there is an image medium. As illustrated in FIG. 2E, an image 252 transported by a fiber cable reaches the end surface 254 of the fiber cable. The image 252 is focused by a set of lenses 256, referred to herein as variable focus elements (VFE), onto an imaging medium 258. The VFE 256 is provided to be adjusted to make sure that the image 252 is precisely focused onto the imaging medium 258. Depending the implementation, the adjustment of the VFE 256 may be done manually or automatically in accordance with an input (e.g., a measurement obtained from a sensor). According to one embodiment, the adjustment of the VFE 256 is performed automatically in accordance with a feedback signal derived from a sensing signal from a sensor looking at an eye (pupil) of the wearer wearing the glasses 200 of FIG. 2A.

Figure 2F:
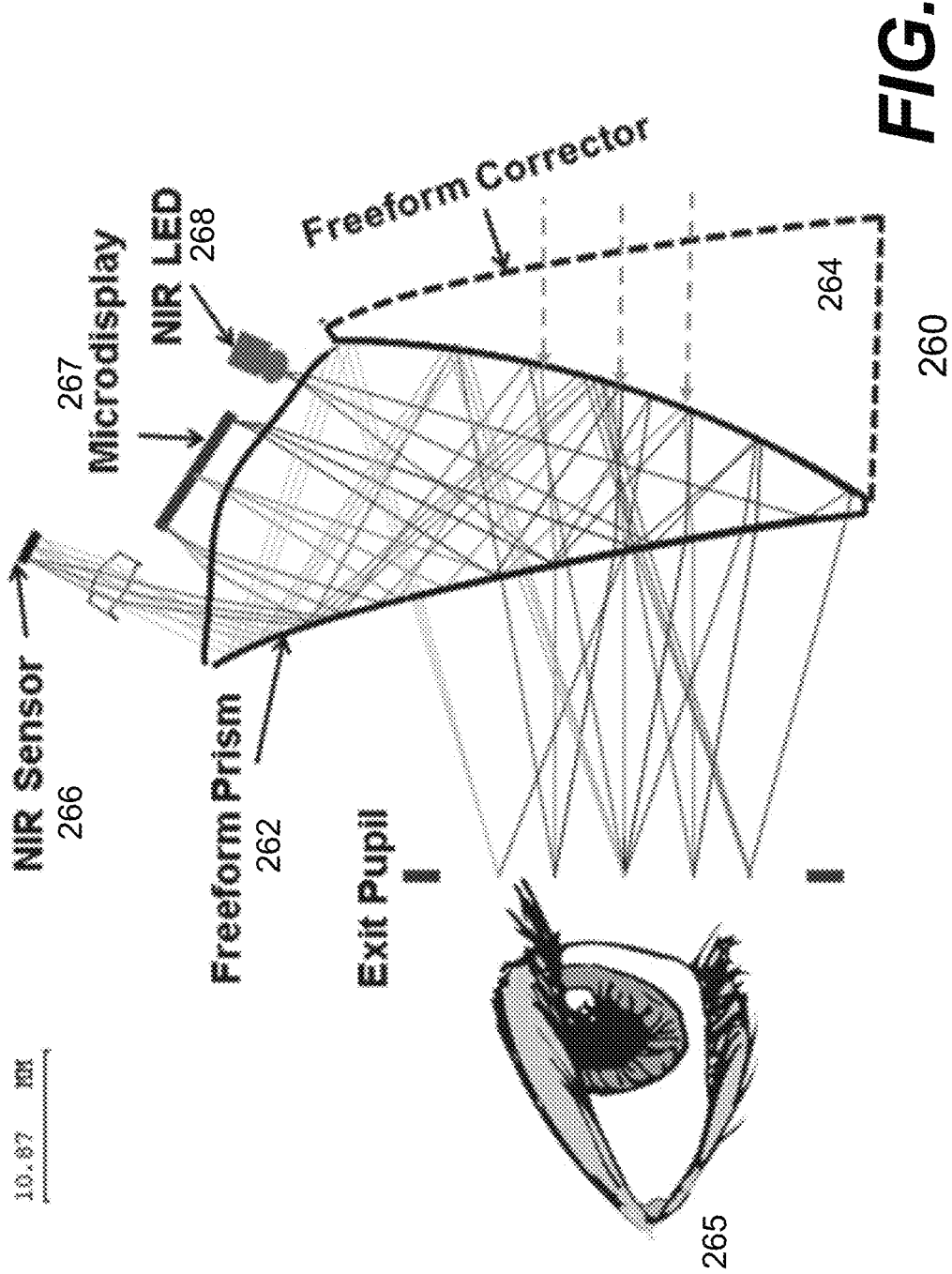
FIG. 2F shows an exemplary lens that may be used in the glasses shown in FIG. 2A, where the lens includes two parts, a prism and an optical correcting lens or corrector.

Referring now to FIG. 2F, it shows an exemplary lens 260 that may be used in the glasses shown in FIG. 2A. The lens 260 includes two parts, a prism 262 and an optical correcting lens or corrector 264. The prism 262 and the corrector 264 are stacked to form the lens 260. As the name suggests, the optical corrector 264 is provided to correct the optical path from the prism 262 so that a light going through the prism 262 goes straight through the corrector 264. In other words, the refracted light from the prism 262 is corrected or de-refracted by the corrector 264. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 262 is not in fact in the shape of geometric prisms, hence the prism 262 is referred herein as a freeform prism, which leads the corrector 264 to a form complementary, reciprocal or conjugate to that of the prism 262 to form the lens 260 (i.e., integrated lens). As further described below, the prism 262 may be simply a waveguide in one embodiment.

On one edge of the lens 260 or the edge of the prism 262, there are at least three items utilizing the prism 262 that may be optionally or selectively used according to one embodiment of the present invention. Referenced by 267 is an imaging medium corresponding to the imaging medium 244 of FIG. 2D or 258 of FIG. 2E. Depending on the implementation, the image transported by the optical fiber 242 of FIG. 2D may be projected directly onto the edge of the prism 262 or formed on the imaging medium 267 before it is projected onto the edge of the prism 262. In any case, the projected image is refracted in the prism 262 and subsequently seen by the eye 265 in accordance with the shapes of the prism 262. In other words, a user wearing a pair of glasses employing the lens 262 can see the image being displayed through or in the prism 262.

A sensor 266 is provided to image the position or movement of the pupil in the eye 265. Again, based on the refractions provided by the prism 262, the location of the pupil can be seen by the sensor 266. In operation, an image of the eye 265 is captured. The image is analyzed to derive how the pupil is looking at the image being shown through or in the lens 260. In the application of AR, the location of the pupil may be used to activate an action. Optionally, a light source 268 is provided to illuminate the eye 265 to facilitate the image capture by the sensor 266. According to one embodiment, the light source 268 uses a near inferred source as such the user or his eye 265 would not be affected by the light source 268 when it is on.

Figure 2G:
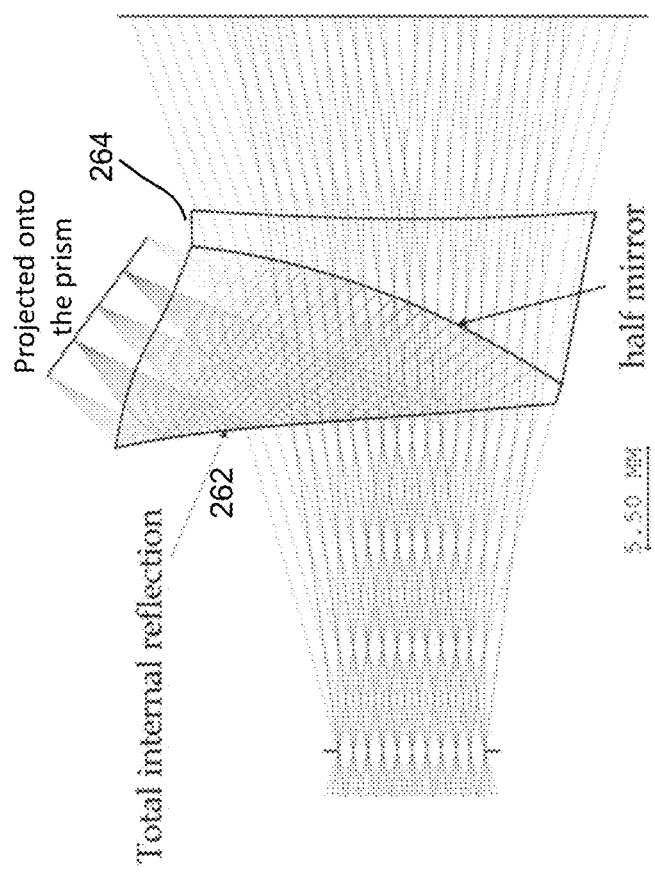
FIG. 2G shows the internal reflections from a plurality of sources (e.g., a sensor, an imaging medium and a plurality of light sources) in an irregular prism.
Figure 2H:
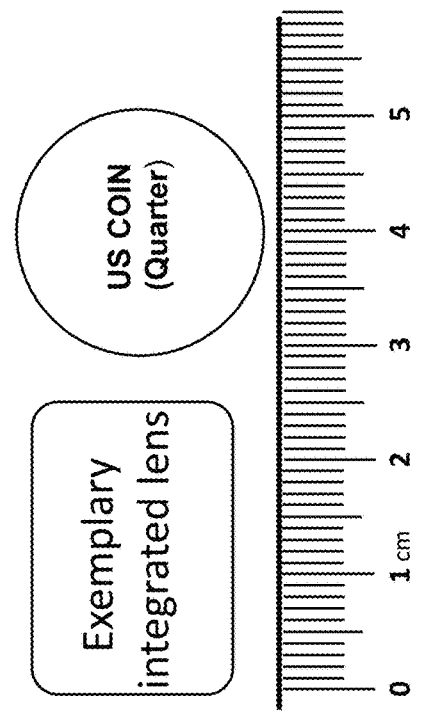
FIG. 2H shows a comparison of such an integrated lens to a coin and a ruler.

FIG. 2G shows the internal reflections from a plurality of sources (e.g., the sensor 266, the imaging medium 267 and the light source 268 ). As the prism is uniquely designed in particular shapes or to have particular edges, the rays from the sources are reflected several times within the prism 268 and subsequently impinge upon the eye 265. For completeness, FIG. 2H shows a comparison of such a lens to a coin and a ruler in sizes.

As described above, there are different types of microdisplays, hence different imaging mediums. The table below summarizes some of the microdisplays that may be used to facilitate the generation of an optical image that can be transported by one or more optical fibers from one end to another end thereof by total internal reflection within the optical fiber(s).

| No. | Microdisplay types | Features | Notes |
| --- | --- | --- | --- |
| 1 | LCoS (LCD and OLED) | Full color image displayed on a silicon | A single image |
| 2 | LCoS + LED (RGB sequentially) LCoS + laser (visible, RGB sequentially) LCoS + laser (non-visible) | A single color image displayed at a time | Three images |
| 3 | SLM + laser (RGB sequentially) | A single optical color image | Three optical images |
| 4 | SLM + laser (non-visible) | A single non-visible color image | Need conversion |

LCoS = Liquid crystal on silicon;
LCD = Liquid crystal display;
OLED = Organic light-emitting diode;
RGB = Red, Green and Blue; and
SLM = Spatial light modulation.

In the first case shown above in the table, a full color image is actually displayed on a silicon. As shown in FIG. 2D, the full color image can be picked up by a focal lens or a set of lenses that project the full image right onto one end of the fiber. The image is transported within the fiber and picked up again by another focal lens at the other end of the fiber. As the transported image is visible and full color, the imaging medium 244 of FIG. 2D may not be physically needed. The color image can be directly projected onto one edge of the prism 262 of FIG. 2F.

In the second case shown above in the table, an LCoS is used with different light sources. In particular, there are at least three colored light sources (e.g., red, green and blue) used sequentially. In other words, a single color image is generated per one light source. The image picked up by the fiber is only a single color image. A full color image can be reproduced when all three different single color images are combined. The imaging medium 244 of FIG. 2D is provided to reproduce the full color image from the three different single color images transported respectively by the optical fiber.

FIG. 2I shows a shirt 270 in which a cable 272 is enclosed within the shirt 270 or attached thereto. The shirt 270 is an example of fabric material or multi-layers. Such a relatively thin cable can be embedded into the multi-layers. When a user wears such a shirt made or designed in accordance with one of the embodiments, the cable itself has less weight while the user can have more freedom to move around.

FIG. 3A shows how three single color images 302 are being combined visually and perceived as a full color image 304 by human vision. According to one embodiment, three colored light sources are used, for example, red, green and blue light sources that are turned sequentially. More specifically, when a red light source is turned on, only a red image is produced as a result (e.g., from a microdisplay). The red image is then picked up optically and transported by the fiber, and subsequently projected into the prism 262 of FIG. 2F. As the green and blue lights are turned on afterwards and sequentially, the green and blue images are produced and transported respectively by the fiber, and subsequently projected into the prism 262 of FIG. 2F. It is well known that human vision possesses the ability of combining the three single color images and perceives them as a full color image. With the three single color images projected sequentially into the prism, all perfectly registered, the eye sees a full color image.

Also in the second case shown above, the light sources can be nearly invisible. According to one embodiment, the three light sources produce lights near UV band. Under such lighting, three different color images can still be produced and transported but are not very visible. Before they can be presented to the eyes or projected into the prism, they shall be converted to three primary color images that can subsequently be perceived as a full color image. According to one embodiment, the imaging medium 244 of FIG. 2D is provided. FIG. 3B shows that three different color images 310 are generated under three light sources respectively at wavelengths A1, A2, and A3, the imaging medium 312 includes three films 314, each coated with a type of phosphor, a substance that exhibits the phenomenon of luminescence. In one embodiment, three types of phosphor at wavelength 405 nm, 435 nm and 465 nm are used to convert the three different color images produced under the three light sources near UV band. In other words, when one such color image is projected onto a film coated with the phosphor at a wavelength 405 nm, the single color image is converted as a red image that is then focused and projected into the prism. The same process is true with other two single color images that go through a film coated with phosphor at wavelength 435 nm or 465 nm, resulting in green and blue images. When such red, green and blue images are projected sequentially into the prism, a human vision perceives them together as a full color image.

In the third or fourth case shown above in the table, instead of using a light either in the visible spectrum or near invisible to human eyes, the light source uses a laser source. There are also visible lasers and non-visible lasers. Operating not much differently from the first and second cases, the third or fourth case uses what is called spatial light modulation (SLM) to form a full color image. A spatial light modulator is a general term describing devices that are used to modulate amplitude, phase, or polarization of light waves in space and time. In other words, SLM+ laser (RGB sequentially) can produce three separate color images. When they are combined with or without the imaging medium, a full color image can be reproduced. In the case of SLM+ laser (non-visible), the imaging medium shall be presented to convert the non-visible images to a full color image, in which case, appropriate films may be used as shown in FIG. 3B.

Figure 4:
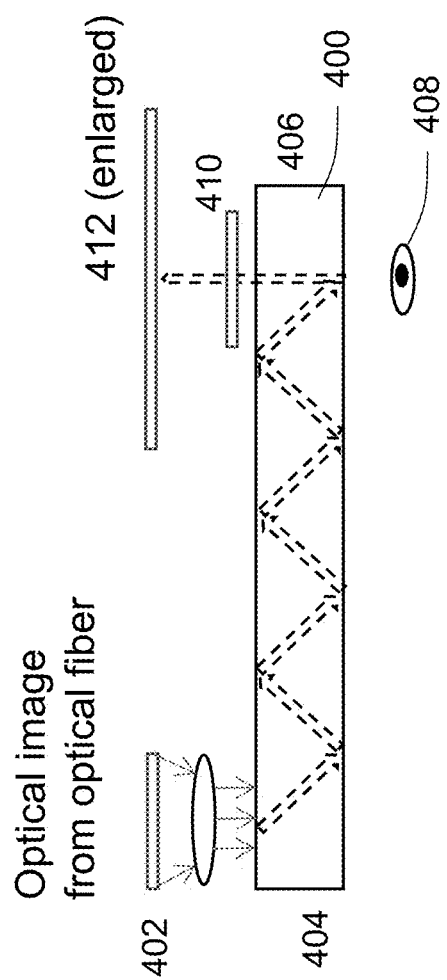
FIG. 4 shows that a waveguide is used to transport an optical image from one end of the waveguide to another end thereof.

Referring now to FIG. 4, it shows that a waveguide 400 is used to transport an optical image 402 from one end 404 of the waveguide 400 to another end 406, wherein the waveguide 400 may be stacked with one or more pieces of glass or lenses (not shown) or coated with one or more films to form or be part of a suitable lens for a pair of glasses for the applications of displaying images from a computing device. It is known to those skilled in that art that an optical waveguide is a spatially inhomogeneous structure for guiding light, i.e., for restricting the spatial region in which light can propagate, where a waveguide contains a region of increased refractive index, compared with the surrounding medium (often called cladding).

The waveguide 400 is transparent and shaped appropriately at the end of 404 to allow the image 402 to be propagated along the waveguide 400 to the end 406, where a user 408 can see through the waveguide 400 so as to see the propagated image 410. According to one embodiment, one or more films are disposed upon the waveguide 400 to amplify the propagated image 410 so that the eye 408 can see a significantly amplified image 412. One example of such films is what is called metalenses, essentially an array of thin titanium dioxide nanofins on a glass substrate.

Figure 5A:
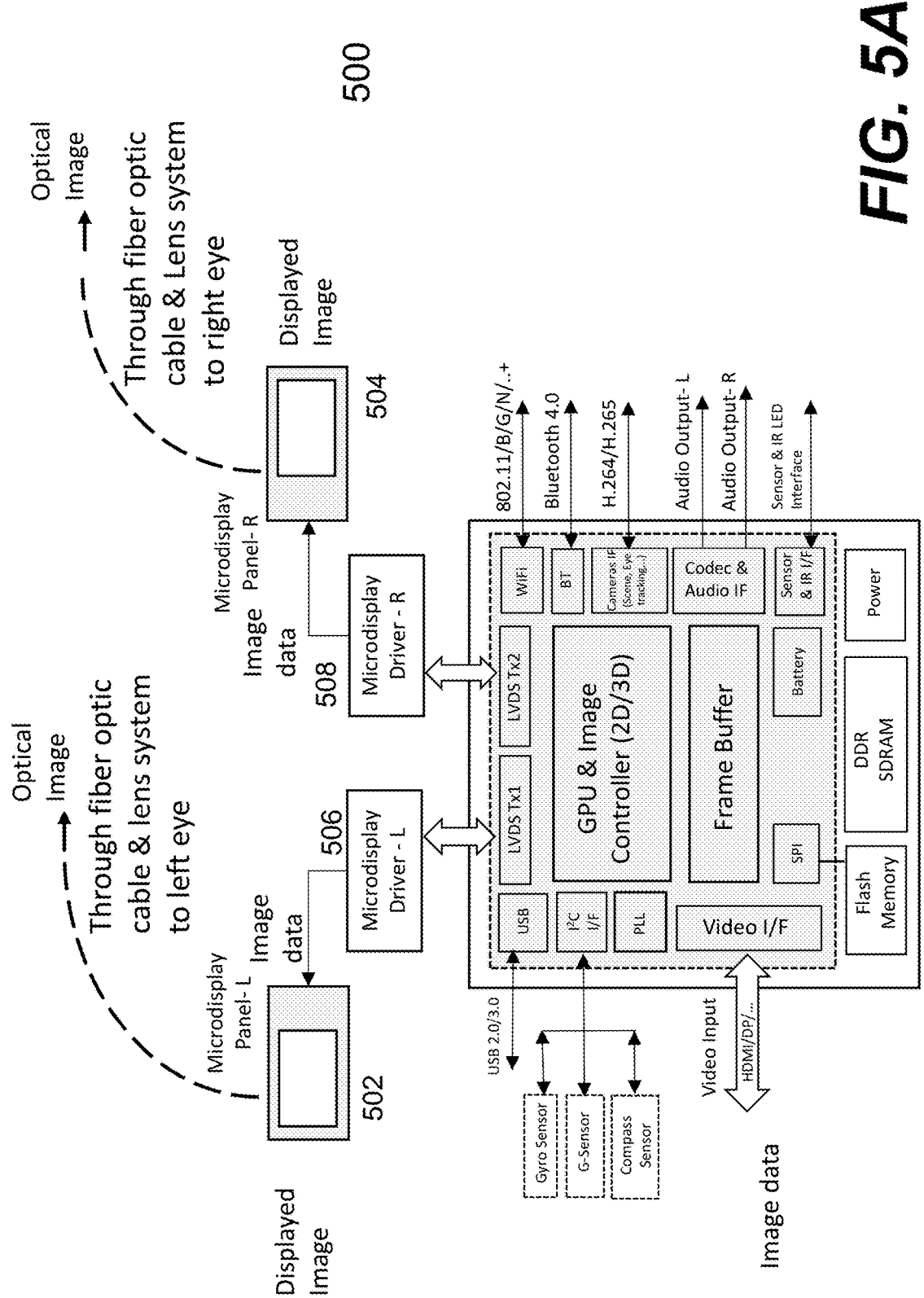
FIG. 5A shows an exemplary functional block diagram that may be used in a separate case or enclosure to produce content related to virtual reality and augmented reality for display on the exemplary glasses of FIG. 2A.

Referring now to FIG. 5A, it shows an exemplary functional block diagram 500 that may be used in a separate case or enclosure to produce content related to virtual reality and augmented reality for display on the exemplary glasses of FIG. 2A. As shown in FIG. 5A, there are two microdisplays 502 and 504 provided to supply content to both of lenses in the glasses of FIG. 2A, essentially a left image goes to the left lens and a right image goes to the right lens. An example of the content is 2D or 3D images and video, or hologram. Each of the microdisplays 502 and 504 is driven by a corresponding driver 506 or 508.

The entire circuit 500 is controlled and driven by a controller 510 that is programmed to generate the content. According to one embodiment, the circuit 500 is designed to communicate with the Internet (not shown), receive the content from other devices. In particular, the circuit 500 includes an interface to receive a sensing signal from a remote sensor (e.g., the sensor 266 of FIG. 2F) via a wireless means (e.g., RF or Bluetooth). The controller 510 is programmed to analyze the sensing signal and provides a feedback signal to control certain operations of the glasses, such as a projection mechanism that includes a focal mechanism auto-focusing and projecting the optical image onto an edge of the prism 262 of FIG. 2F or the waveguide 400 of FIG. 4. In addition, the audio is provided to synchronize with the content, and may be transmitted to earphones wirelessly (e.g., via Bluetooth).

FIG. 5A shows an exemplary circuit 500 to produce the content for display in a pair of glasses contemplated in one embodiment of the present invention. The circuit 500 shows that there are two microdisplays 502 and 504 used to provide two respective images or video streams to the two lenses of the glasses in FIG. 2A. According to one embodiment, only one microdisplay may be used to drive the two lenses of the glasses in FIG. 2A. Such a circuit is not provided herein as those skilled in the art know how the circuit can be designed or how to modify the circuit 500 of FIG. 5A.

Figure 5B:
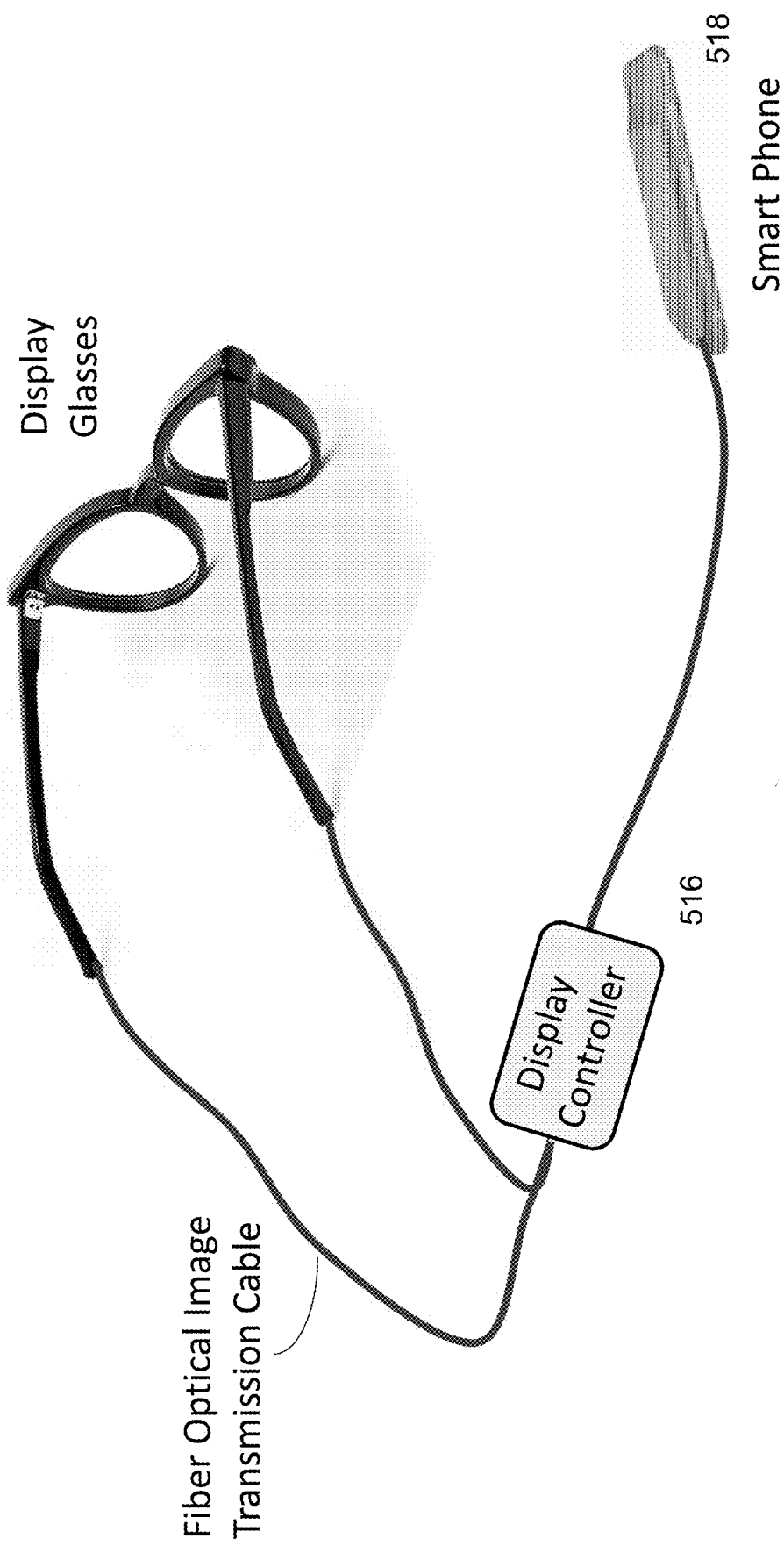
FIG. 5B shows an implementation in which an exemplary circuit is housed in a separate device (a.k.a., an image engine herein) according to an implementation.
Figure 5C:
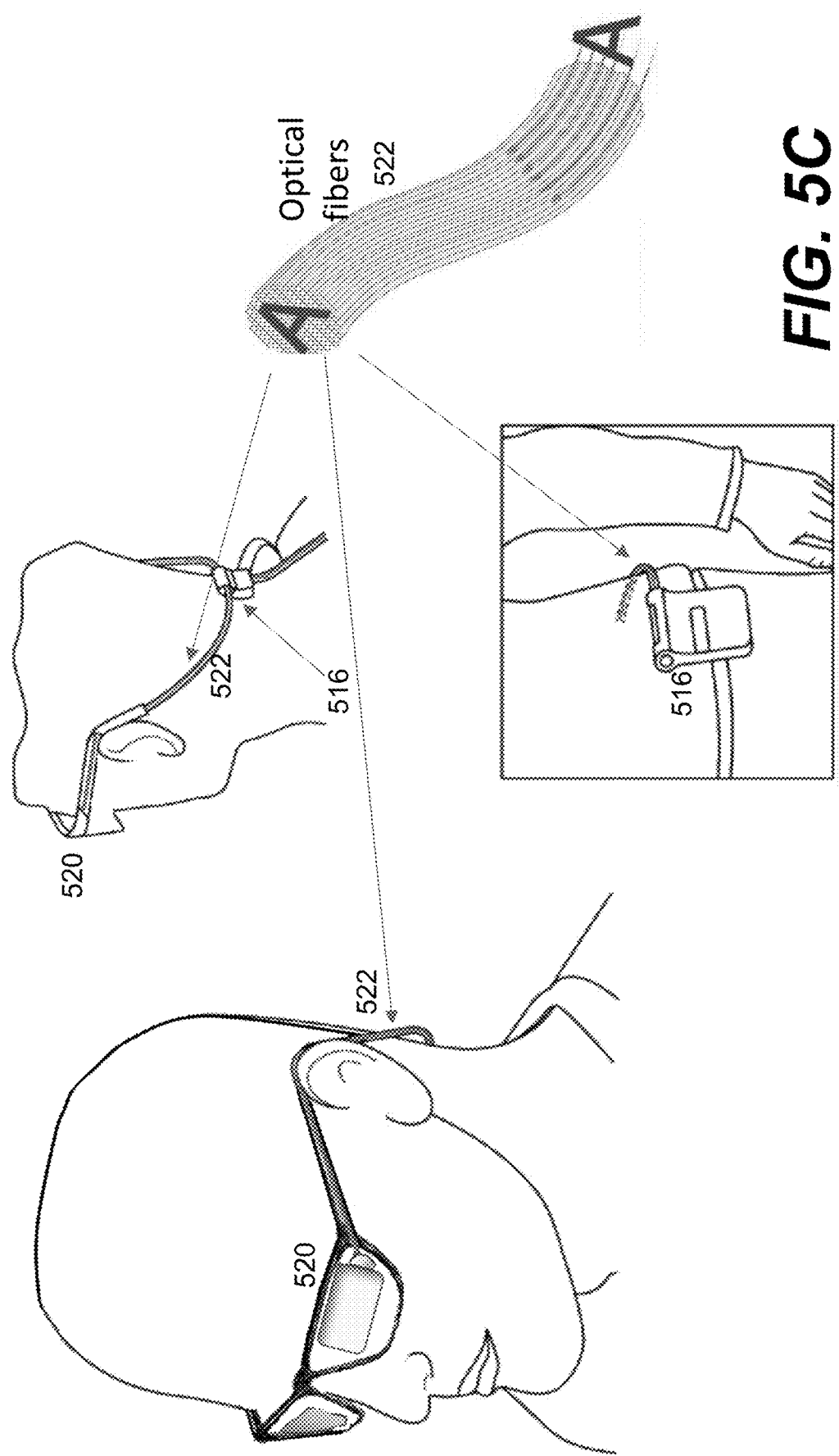
FIG. 5C shows an exemplary embodiment to show how a user wears a pair of display glasses designed according to one embodiment of the present invention.

FIG. 5B shows an implementation in which the exemplary circuit 500 is housed in a separate device 516 according to an implementation. The device 516 includes necessary electronic components to receive source images or video from a smart phone 518 that also acts as a controller and provides necessary interfaces for the wearer or user to control what to receive and show on the display glasses, and how to interact with the display. FIG. 5C shows an exemplary embodiment to show how a user wears such display glasses. According to one embodiment, the display glasses 520 include no active electronic components (power driven) but a pair of optical fibers 522 in terms of delivering images or videos. The accompanying sound can be provided directly to earphones (e.g., earbuds or airbuds) by the smart phone 518. As will be further described below, the thickness or the number of the optical fibers 522 is further reduced by transmitting or transporting low-resolution images/video from the image engine 516 to the glasses 520.

Figure 5D:
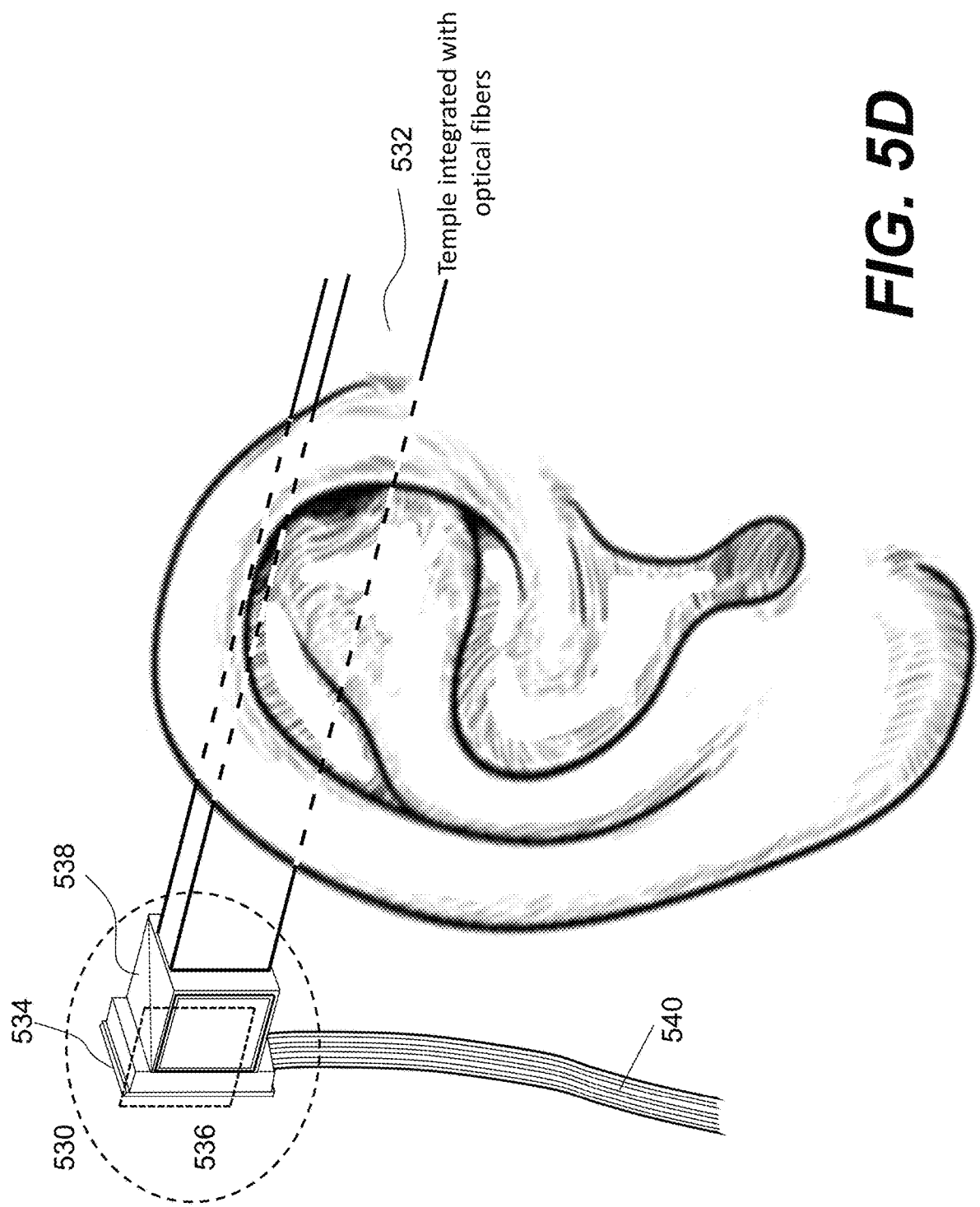
FIG. 5D shows an example of having some parts (a.k.a., image engine) to be located near the end of a temple.

According to one embodiment of the present invention, FIG. 5D shows an example of having some parts (a.k.a., image engine) 530 of the electronic components in the device 516 to be located near the end of a temple 532. The image engine 530 includes a light source 534 to shine an SLM (e.g., LCoS) 536 implemented to perform AM and PM and optical components 538 to provide generated image (e.g., holograms) to be transported via the fibers integrated in the temple 532 to the lens (not shown). In operation, image data is provided to the image engine 530 via wires 540 coupled to the device 516.

Figure 5E:
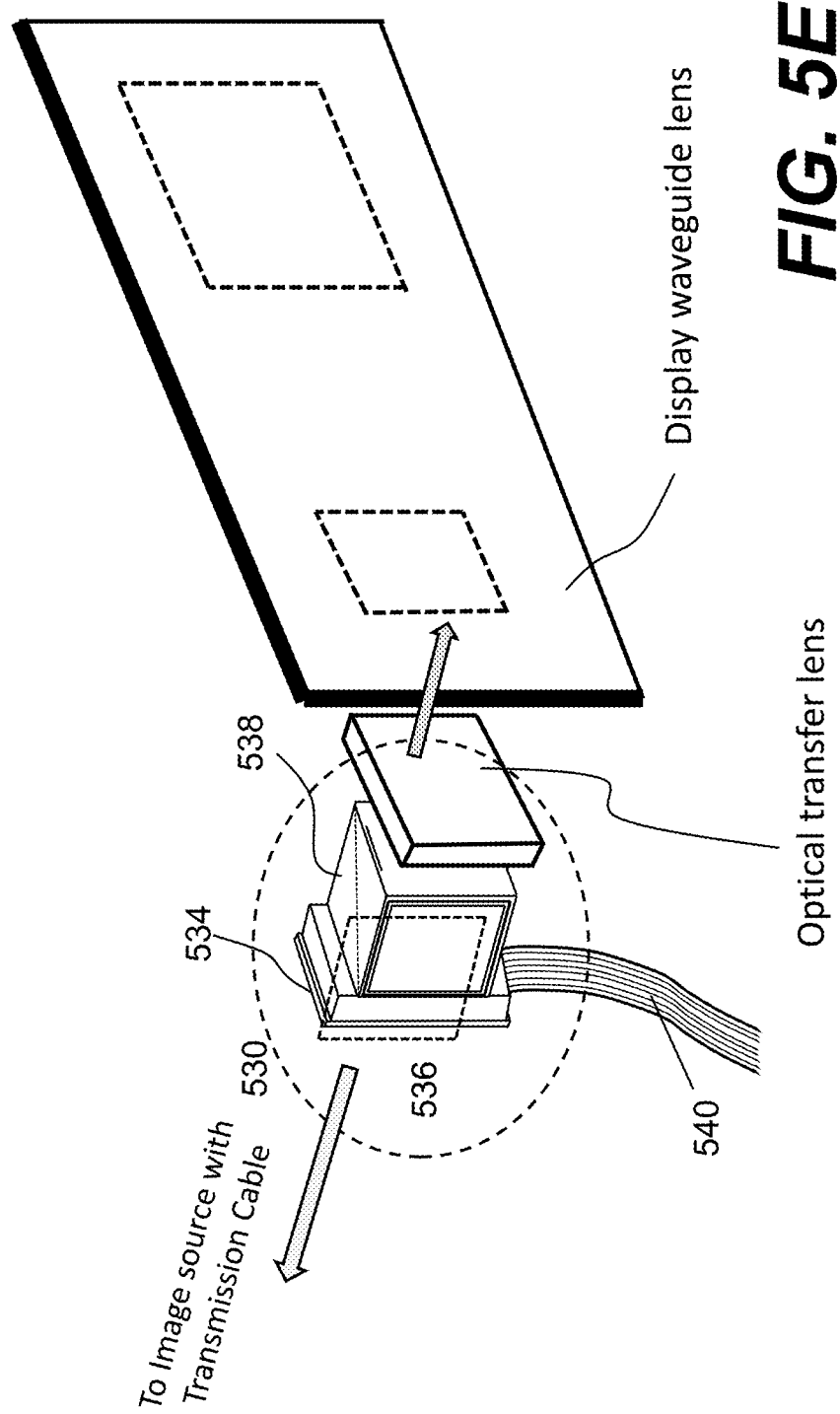
FIG. 5E shows an example of an image engine (source) located near an end of a temple in glasses, namely the hinge area.

According to one embodiment of the present invention, FIG. 5E shows an example of the image engine 530 located near the other end of the temple 532, namely the hinge area in a pair of traditional glasses. In this example, the image data is provided directly to the image engine 530 via wires 540 coupled to the device 516.

Figure 5F:
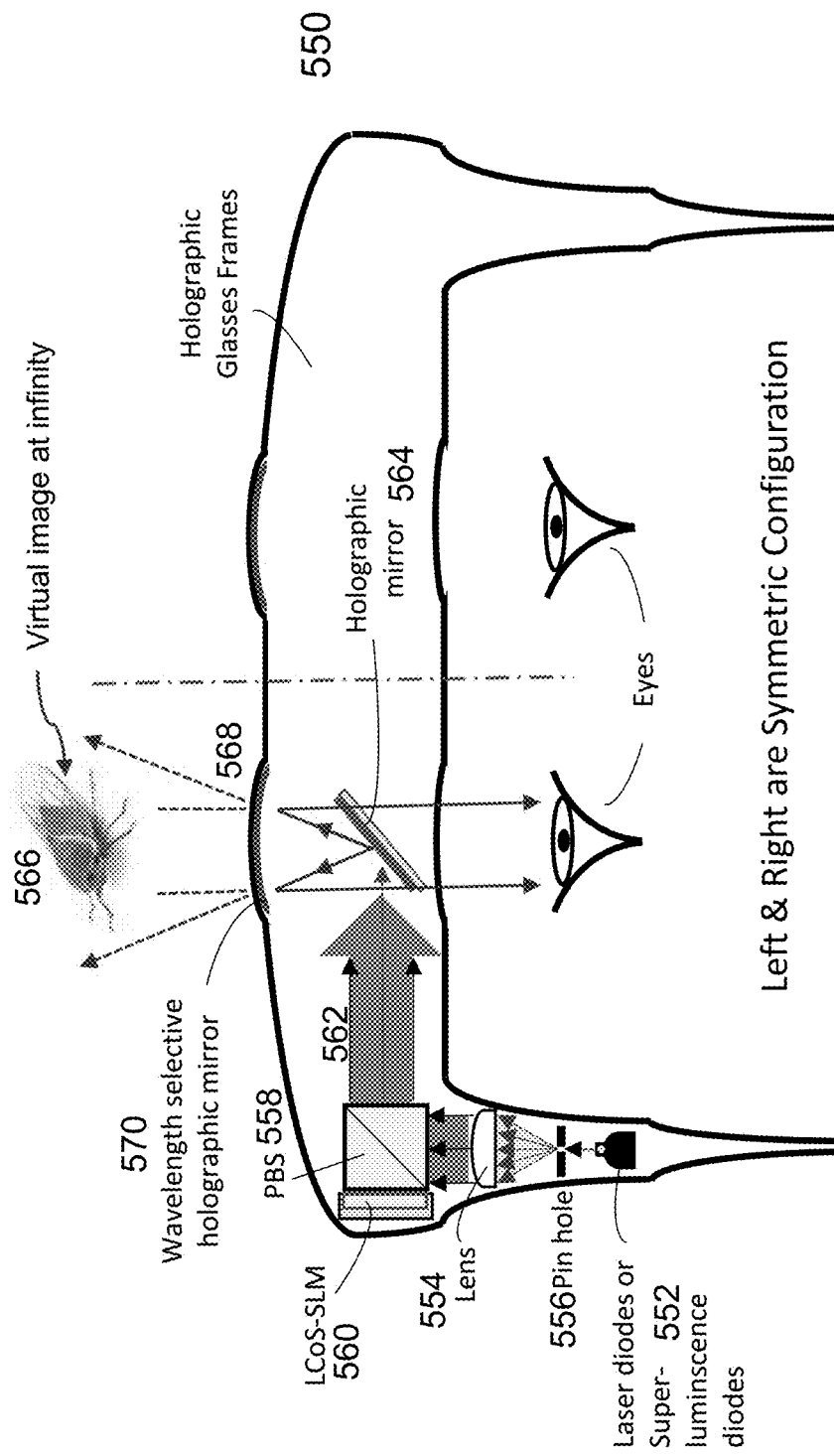
FIG. 5F shows a top view of a wearable display device configured to display holograms according to one embodiment of the present invention.

FIG. 5F shows a top view 550 of a wearable display device configured to display holograms according to one embodiment of the present invention. At least one laser diode 552 is provided as a laser source used to generate a laser light sheet 554 via an optical or mirror configuration 556, where the laser light sheet 554 is a uniform planar light. The light sheet 554 is impinged upon an optical cube 558 (made of two halves in one embodiment) that directs the light sheet 554 onto an SLM 560. As will be further described below, the light 554 is modulated in accordance with the image displayed on the SLM 560 and further modulated in both amplitude and phase. The reflected light 562 is projected onto a mirror 564 that redirects or turns the reflected light 562 90 degrees forward. A user wearing the wearable display device can view a hologram 566 through the mirror 564, where the mirror 564 is optically coated to selectively allow certain wavelength to pass through or reflect. To prevent the projected hologram 566 from being reflected by a lens 568, the lens 568 is coated optically or integrated with a wavelength selective holographic mirror 570 to selectively allow certain wavelength to pass through.

Figure 5G:
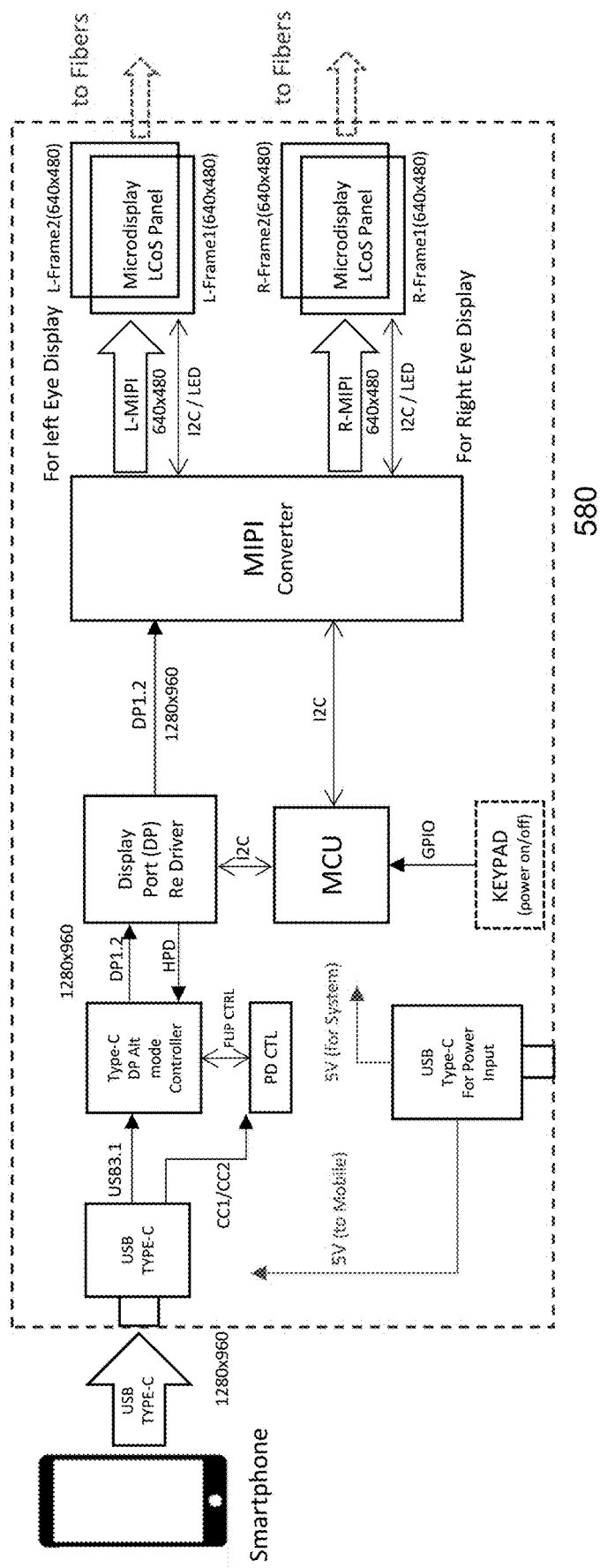
FIG. 5G shows an exemplary circuit block diagram, according to one embodiment, that employs the techniques disclosed in U.S. Pat. No. 10,147,350, content of which is hereby incorporated by reference.

FIG. 5G shows an exemplary circuit block diagram 580, according to one embodiment, that employs the techniques disclosed in U.S. Pat. No. 10,147,350, content of which is hereby incorporated by reference. As shown in FIG. 5G, the circuit 550 essentially generates two low-resolution images (e.g., 640×480), where these two images are diagonally shifted by one half (½) pixel and have a refresh rate of 120 Hz (versus a commonly used "standard" refresh rate 60 Hz in US). The commonly used "standard" refresh rate for most TVs, PC monitors, and smartphone displays is 60 Hz. A refresh rate of 60 Hz means that the display refreshes 60 times each second. In other words, the image on the display is updated (or refreshed) once every 16.67 milliseconds (ms). When two such images are refreshed twice the standard refresh rate, the perceived image resolution is doubled, namely to 1280×960 perceived by the user on the integrated glasses.

According to one embodiment, an image for display on the display glasses is in native (first) resolution, for example 640×480 or a predefined resolution for efficient transmission through the optical fibers, and has a first refresh rate when in video. In case the image is in a resolution higher than the first resolution, it may be reduced to a lower resolution. A duplicated but one half (½) pixel diagonally shifted image is generated per U.S. Pat. No. 10,147,350, resulting in a second image in the first resolution, both such images are successively projected onto the optical fibers 522 at twice the refresh rate of the original image, namely second refresh rate=2× first refresh rate. When the images exit successively from the other end of the optical fibers, they are perceived in a waveguide as an image in second resolution, twice as much as the first resolution.

Figure 6E:
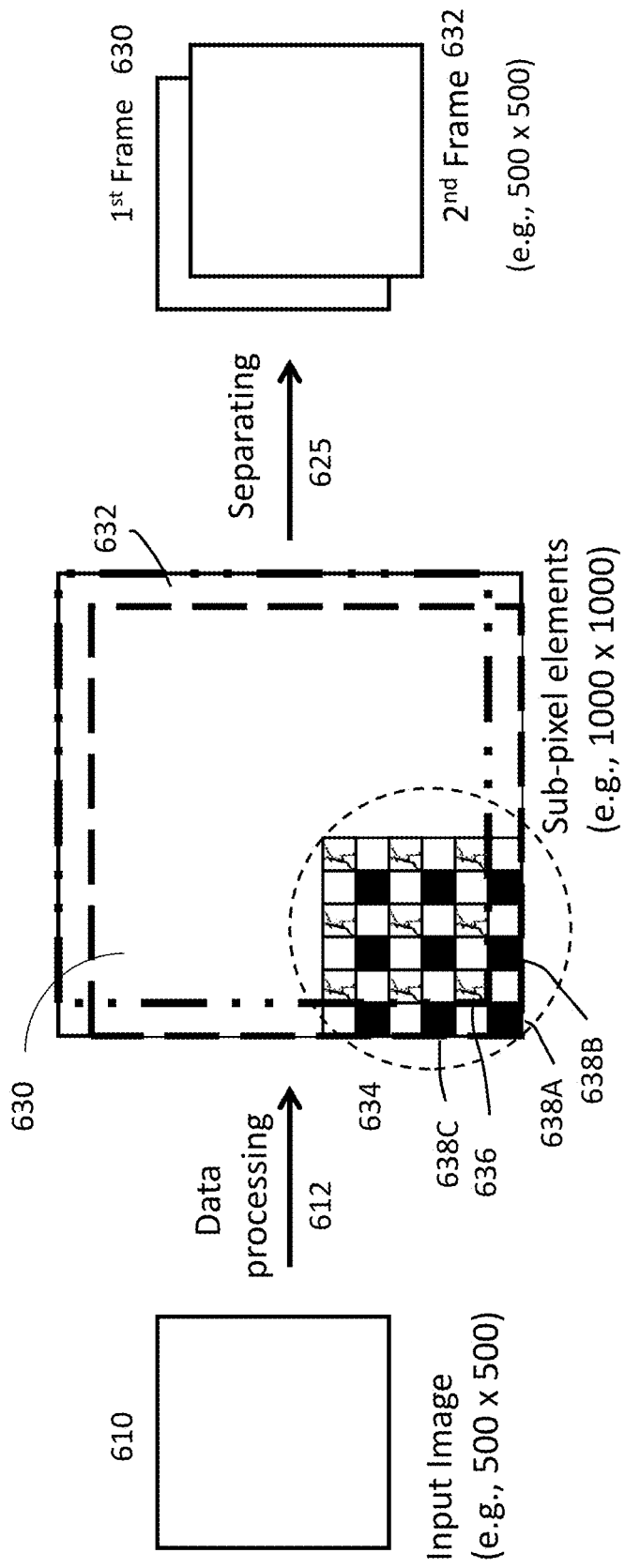
FIG. 6E shows another embodiment to expand an input image to an expanded image with two decimated and interlaced images.

FIG. 6A-FIG. 6E duplicate FIG. 16A-FIG. 16E of U.S. Pat. No. 10,147,350. As described above, optical images exiting from the optical fibers in one embodiment of the present invention is to double the perceived spatial resolution of an input image. Referring to FIG. 6A, it shows an array of pixel elements 600, as an example, each 602 of the pixel elements 600 (forming an image or a data image) is shown to have four sub-image elements 604A, 604B, 604C and 604D. When an input image of a first resolution (e.g., 500×500) is received and displayed in the first resolution, each of the pixel values is stored in each of the pixel elements 600. In other words, the sub-image elements 604A, 604B, 604C and 604D are all written or stored with the same value and are addressed at the same time. As shown in FIG. 6A, the word line (e.g., WL0, WL1 or WL2) addresses two rows of sub-pixels belonging to the pixel 602 at the same time while the bit line (e.g., BL0, BL1 or BL2) addresses two columns of sub-pixels belonging to the pixel 602 at the same time. At any moment, a pixel value is written to a pixel 602, the sub-image elements 604A, 604B, 604C and 604D therein are all selected. In the end, the input image is displayed in the first resolution (e.g., 500×500), namely the same resolution as that of the input image.

It is now assumed that an input (data) image of a first resolution (e.g., 500×500) is received and displayed in a second resolution (e.g., 1000×1000), where the second resolution is twice as much as that the first resolution. According to one embodiment, the sub-pixel elements are used to achieve the perceived resolution. It is important to note that such improved spatial resolution is perceived by human eyes, not actually the doubled resolution of the input image. To facilitate the description of the present invention, FIG. 6B and FIG. 6C are used to show how an input image is expanded to achieve the perceived resolution.

It is assumed that an input image 610 is of 500×500 in resolution. Through a data process 612 (e.g., upscaling and sharpening), the input image 610 is expanded to reach an image 614 in dimension of 1000×1000. FIG. 6C shows an example of an image 616 expanded to an image 618 of double size in the sub-pixel elements. In operation, each of the pixels in the image 616 is written into a group of all (four) sub-pixel elements (e.g., the exemplary sub-pixel structure of 2×2). Those skilled in the art understand that the description herein is readily applicable to other sub-pixel structures (3×3, 4×4 or 5×5, and etc.), resulting in even more perceived resolution. According to one embodiment, a sharpening process (e.g., part of the data processing 612 of FIG. 16B) is applied to the expanded image 618 to essentially process the expanded image 618 (e.g., filtering, thinning or sharpening the edges in the images) for the purpose of generating two frames of images from the expanded image 618. In one embodiment, the value of each sub-pixel is algorithmically recalculated to better define the edges and produce the image 620, In another embodiment, values of neighboring pixels are referenced to sharpen an edge.

The processed image 620 is then separated into two images 622 and 624 by the separation process 625. Both 622 and 624 have a resolution same as that of the input image (e.g., 500×500), where the sub-pixel elements of images 622 and 624 are all written or stored with the same value. The boundary of pixel elements in the image 622 is purposely to be different from the boundary of pixel elements in the image 624. In one embodiment, the boundaries of pixel elements are offset by half-pixel (one sub-pixel in a 2×2 sub-pixel array) vertically and by half-pixel (one sub-pixel in a 2×2 sub-pixel array) horizontally. The separation process 625 is done in a way that, when overlapping images 622 and 624, the combined image can best match the image 620 of quadruple resolution of the input image 616. For the example in FIG. 6C, to keep the constant intensity of the input image 610, the separation process 625 also includes a process of reducing the intensity of each of the two images 622 and 624 by 50%. Operationally, the intensities in the first image are reduced by N percent, where N is an integer and ranged from 1 to 100, but practically is defined around 50. As a result, the intensities in the second image are reduced by (100−N) percent. These two images 622 and 624 are displayed alternatively at twice the refresh rate as that for the original input image 610. In other words, if the input image is displayed at 50 Hz per second, each of pixels in two images 622 and 624 are displayed 100 Hz per second. Due to the offset in pixel boundary and data process, viewers perceive the combined image close to the image 620. Offsetting the pixel boundary between images 622 and 624 has the effect of "shifting" pixel boundary. As illustrated as two images 626 and 628 according to another embodiment, the example in FIG. 6C is like shifting a (sub)pixel in southeast direction.

Depending on implementation, the separation process 625 may be performed based on an image algorithm or one-pixel shifting, wherein one-pixel shifting really means one subpixel in the sub-pixel structure as shown in FIG. 6A. There are many ways to separate an image of N×M across the intensity into two images, each of N×M, so that the perceived effect of displaying the two images alternatively at the twice refresh rate reaches the visual optimum. For example, one exemplary approach is to retain/modify the original image as a first frame with reduced intensity while producing the second frame with the remaining from the first frame, again with reduced intensity. Another exemplary approach is to shift one half (½) pixel (e.g., horizontally, vertically or diagonally) from the first frame (obtained from the original or an improved thereof) to produce the second frame, more details will be provided in the sequel. FIG. 6C shows that two images 622 and 624 are produced from the processed expanded image 620 per an image algorithm while that two images 626 and 628 are generated by shifting the first frame on pixel diagonally to produce the second frame. It should be noted that the separation process herein means to separate an image across its intensities to produce two frames of equal size to the original image. FIG. 6D illustrates an image of two pixels, one being full intensity (shown as black) and the other one being one half of the full intensity (shown as grey). When the two pixel image is separated into two frames of equal size to the original, the first frame has two pixels, both being one half of the full intensity (shown as grey) and the second frame also has two pixels, one being one half of the full intensity (shown as grey) and the other being almost zero percent of the full intensity (shown as white). Now there are twice as many pixels as the original input image, displayed in a checkerboard pattern. Since each pixel is refreshed only 60 times per second, not 120, the pixels are half as bright, but because there are twice as many of them, the overall brightness of the image stays the same.

Referring now to FIG. 6E, it shows another embodiment to expand an input image 610. It is still assumed that the input image 610 is of 500×500 in resolution. Through the data process 612, the input image 610 is expanded to reach a dimension of 1000×1000. It should be noted that 1000× 1000 is not the resolution of the expanded image in this embodiment. The expanded image has two 500×500 decimated images 630 and 632. The expanded view 634 of the decimated images 630 and 632 shows that pixels in one image is decimated to allow the pixels of another image to be generated therebetween. According to one embodiment of the present invention, the first image is from the input image while the second image is derived from the first image. As shown in the expanded view 634 of FIG. 6E, an exemplary pixel 636 of the second image 632 is derived from three pixels 638A, 638B and 638C. The exemplary pixel 632 is generated to fill the gap among three pixels 638A, 638B and 638C. The same approach, namely shifting by one half (½) pixel, can be applied to generate all the pixels for the second image along a designated direction. At the end of the data processing 612, there is an interlaced image including two images 630 and 632, each is of 500× 500. A separation process 625 is applied to the interlaced image to produce or restore therefrom two images 630 and 632.

Figure 7A:
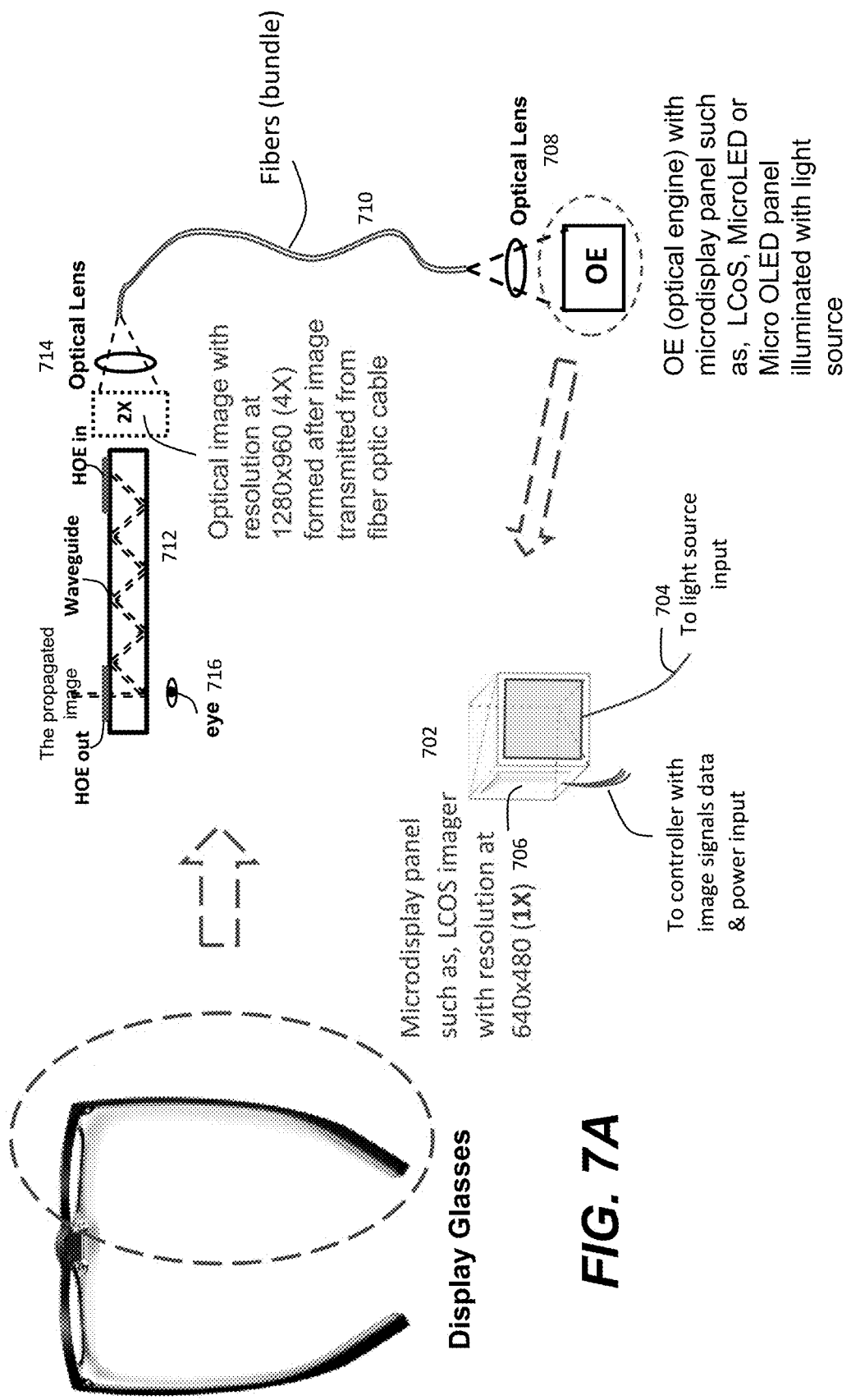
FIG. 7A shows one embodiment of how an optical image is generated using an optical cube.

Referring now to FIG. 7A, it shows one embodiment how an optical image is generated using an optical cube 702. With a light source 704, the image displayed on a microdisplay (e.g., LCoS or OLED) 706 is projected as an optical image (light intensities) picked up by a lens 708. The optical image is then transported via the optical fibers 710 to another end thereof. The optical image is then projected into a waveguide or integrated lens 712 via another lens (e.g., collimator) 714. The optical image is eventually seen by a human eye 716 in the waveguide 712.

According to one embodiment, the light source 704 is a laser light sheet generated from a laser dot. There are many optical ways to generate a uniform laser light sheet (a planar laser), the detail of which is not to be further described herein to avoid obscuring important aspects of the present invention. The laser light sheet is used to shine the SLM 706 and modulated both in amplitude and phase. The reflected light from the SLM 706 is captured via a lens (not shown) and focused upon a medium (e.g., the waveguide 712 or an end of optical fibers). In operation, three laser light sheets in three primary colors (e.g., Red, Green and Blue) are sequentially impinged upon the SLM 706, assuming the SLM 706 is a reflective device. Each of the light sheets is modulated in the SLM 706 and the reflected (modulated) light intensities are coupled to the waveguide 712, where a user can view a reproduced colorful hologram.

Figure 7B:
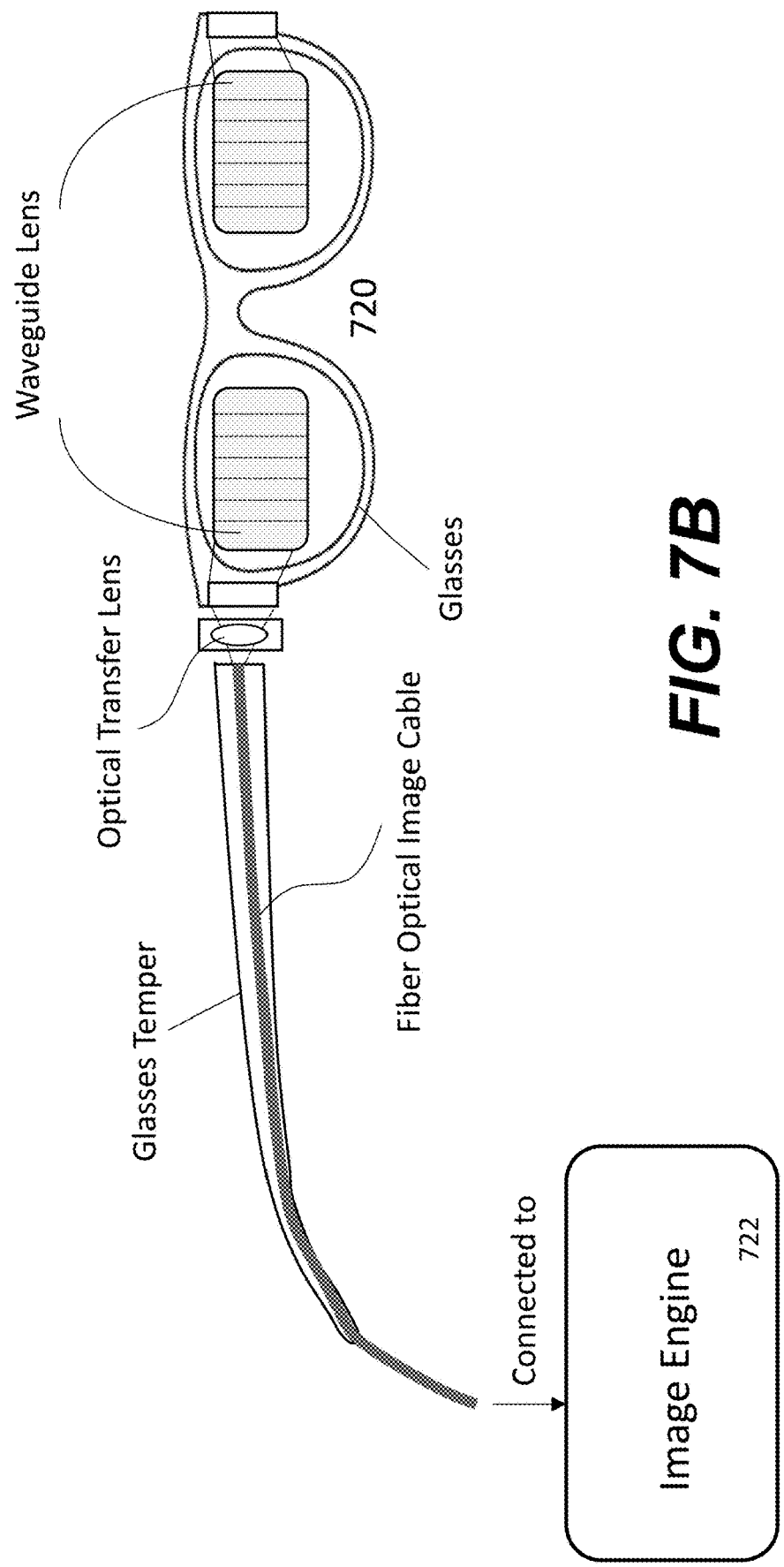
FIG. 7B shows that the display glasses do not include any other power-driven electronic parts to provide an image or video to the integrated lens.

FIG. 7B shows that the display glasses 720 do not include any other power-driven electronic parts to provide an image or video to the integrated lens when the image engine 722 is located in an external device (e.g., an enclosure 516 of FIG. 5B), thus the display glasses 720 can be made extremely light in weight while still able to see all types of images/ videos including holograms.

FIG. 8A shows an exemplary structure 800 of LCoS that may be used in the image engine 530 of FIG. 5D or 5E or the image engine 722 of FIG. 7B. In a perspective, the LCoS produces a 2-dimentional optical image (i.e., 2D varying intensities of light or modulated light). It is very well known that a digital image can be transmitted via a data cable but an optical image cannot be transmitted via such a data cable. In general, an optical image can be transported via an optical medium (e.g., air, waveguide or optical fibers) depending on applications. Instead of using tiny mirrors that turn on and off, LCoS uses liquid crystals as light modulators by turning angles thereof to control the amount of reflected light.

A liquid crystal (LC) is a substance that is in mesomorphic state (not exactly a liquid or a solid). Its molecules usually hold their shape, like a solid, but they can also move around, like a liquid. Nematic liquid crystals, for example, arrange themselves in loose parallel lines. A layer of liquid crystals (or a LC layer) is positioned, sandwiched or coupled between a transparent electrode layer and a reflecting electrode layer, where the reflecting electrode comprises an array of pixel electrodes and is built on a silicon substrate. It should be noted that there are other layers integrated with the LC layer between the transparent electrode layer and the reflecting electrode layer. As used herein, the term "positioned", "sandwiched" or "coupled" between two layers does not mean there is only one item between the two layers. Other layers of materials or components may be added on top of the item or sandwich the item to alter, modify or enhance the behavior, performance or characteristics of the item, all between the two layers. When placed between two polarized layers, the twisted crystals guide the path of light. When a voltage difference is applied between the transparent electrode layer and one pixel electrode, LC molecules therebetween are re-orientated with an applied electric field. By changing the direction of the light, the crystals allow or prevent its passage therethrough.

The molecules of liquid crystals are usually much longer than they are wide. In a rod-like liquid crystal, the molecules are oriented in the same direction locally, giving rise to optical birefringence, i.e., the index of refraction along the long axis of the molecule is significantly different than the optical index perpendicular to it. In another words, birefringence is the optical property of a material having a refractive index that depends on the polarization and propagation direction of light. Without further getting into the details of the molecules and/or the liquid crystals and how they affect the birefringence, which beyond the scope of the present invention, it is known that controlling how the light or the polarization and propagation direction of light entering the liquid crystals dictates the reflectance or transmittance of the light going through the LC layer.

When a voltage difference is applied between the transparent electrode layer and one pixel electrode, the LC molecules therebetween are re-orientated with an applied electric field. By changing the direction of the light, the crystals allow or prevent its passage therethrough. Since the LC is birefringent, the orientation results in a phase shift, commonly known phase retardation, to the light, where the phase retardation is controllable by the voltage difference due to the Electric Controlled Birefringence Effect, ECB Mode).

When a linear polarized incident light enters the LC layer at an angle of φ to the director axis of the liquid crystal, it is split into two beams with different polarizations, namely the extraordinary wave (E-light), in which the polarization direction is parallel to the liquid crystal axis, and the ordinary wave (O-light), in which the polarization direction is perpendicular to the axis. Since the E-light and the O-light pass through the liquid crystal with different velocities, their indices of refraction are different. Consequently, a phase difference $\delta$ exists between the two waves when they emerge from the liquid crystal, i.e.:

$$\delta = 2\pi d\left(\frac{1}{\lambda_e} - \frac{1}{\lambda_o}\right) = 2\pi d\frac{(n_e - n_o)}{\lambda_v} = \frac{2\pi d \Delta n}{\lambda_v} \qquad \text{Eq. (1)}$$

where d is the cell gap (i.e., the thickness of the LC layer), $\Delta n$ depends on the applied voltage, the temperature, and the wavelength of the incident light $\lambda_v$, and is given by $\Delta n = n_e - n_o$, which is also referred to as birefingence.

When a homogeneous cell is sandwiched between two polarizers, the normalized light transmittance is governed by the following equation:

$$T = \cos^2 X - \sin 2\beta \sin 2(\beta - X)\sin^2(\delta/2); \qquad \text{Eq. (2)}$$

where X is the angle between the polarizer and an analyzer, β is the angle between the polarizer and the LC directors, and $\delta$ is the phase retardation expressed in the Equation 1. For the simplest case that β=45 degrees and the two polarizers are either parallel (X=0) or crossed (X=90), the normalized light transmittances are simplified to:

$$T_{//} = \cos^2(\delta/2); \qquad \text{Eq. (3)}$$

$$T_{\perp} = \sin^2(\delta/2); \qquad \text{Eq. (4)}$$

As further shown in FIG. 8A, there is an essential part, the alignment layer, that dictates the macroscopic uniform alignment of liquid crystalline molecules (mesogens) near its surface, essentially to orientate the LC molecules with a specific pretilt angle, which is the angle between the director of the LC molecules and the alignment layers. FIG. 8B. 1 shows an exemplary cross view of an LC layer with the alignment layer, where the pretilt alignment dictates the characteristics of light going through the LC molecules. Different pretilt alignment angles may produce very different modulated lights, so does the thickness of the LC (e.g., a corresponding light path therethrough). There are ways of forming the surface alignment layer. One example is to use unidirectional mechanical rubbing of thin polyimide coating. A thin film is spin coated and then cured at appropriate temperature according to the polyimide type. Thereafter, the cured film is rubbed with a velvet cloth, producing micro or nano grooves along the rubbing direction to which the LC molecules are aligned accordingly. FIG. 8B. 2 shows functional layers in an exemplary LCoS.

Figure 8C:
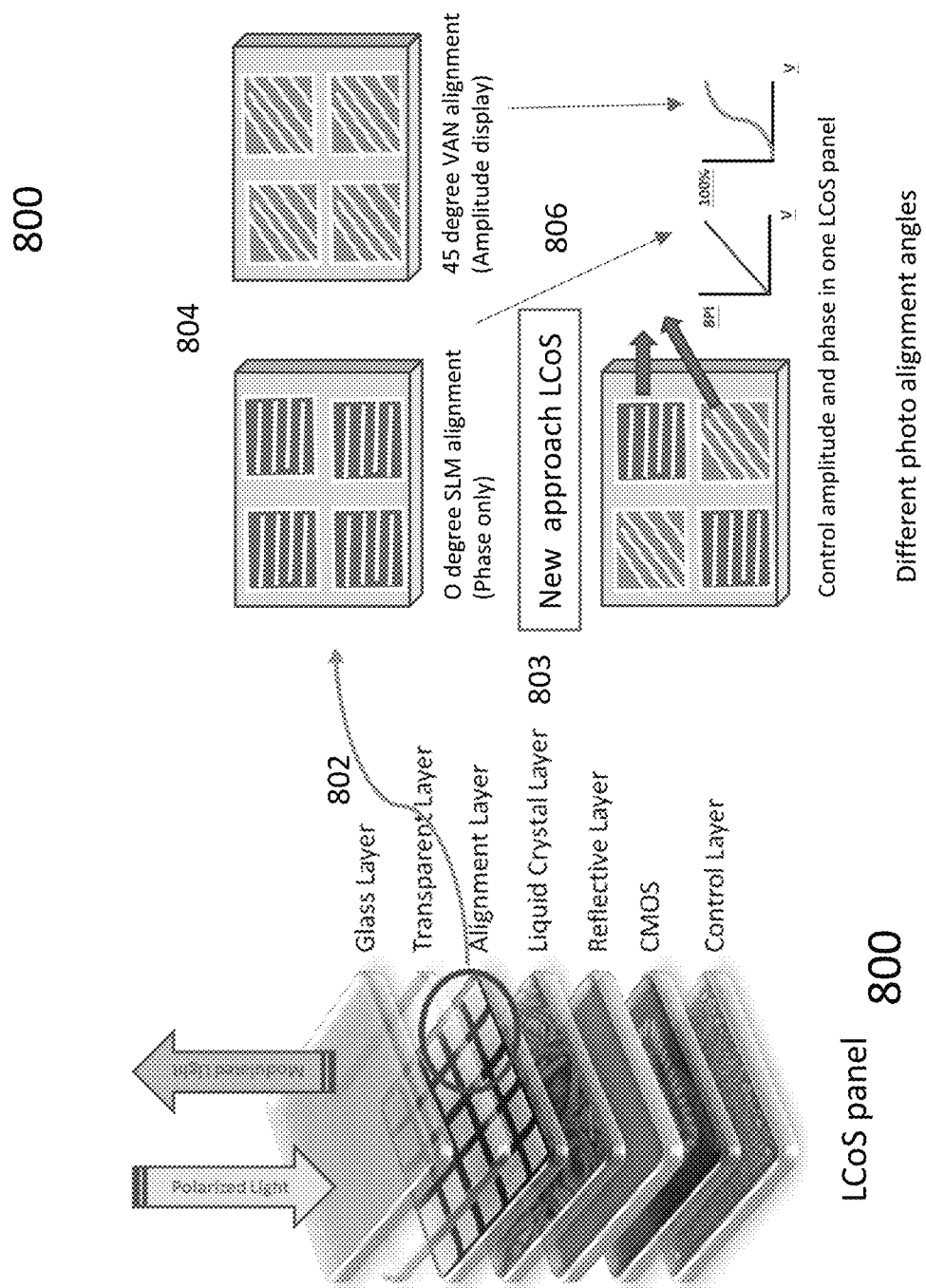
FIG. 8C shows an example of how an LCoS may be modified or redesigned to implement one embodiment of the present invention.

Referring now to FIG. 8C, it shows an example of how an LCoS 800 can be modified or redesigned to implement one embodiment of the present invention. An alignment layer 802 is deposed on top of a layer of liquid crystals 803 (i.e., an LC layer) to configure the liquid crystals to have predetermined pretilt-alignment angles over the entire array of pixels. An incident light is transmitted through the LC layer with almost zero absorption. The integration of high-performance driving circuitry allows the applied voltage to be changed on each pixel, thereby controlling the phase retardation of the incident wavefront across the device. Currently, there are two types of light modulation using LCoS devices, amplitude modulation (AM) and phase modulation (PM). In the AM case, the amplitude of the light signal is modulated by varying the linear polarization direction of the incident light. In the PM case, the phase delay is accomplished by electrically adjusting the optical refractive index along the light path. The details of how an incoming light is modulated by the liquid crystals (LC) or in the LC layer are not to be further described to avoid obscuring aspects of the present invention. One of the objectives, benefits and advantages in the present invention is to control the pretilt alignment angles via a modified alignment layer or an array of alignment cells integrated with an alignment layer. To facilitate the description of the present invention, for AM, all the alignment cells are diagonally aligned (e.g., neither horizontally nor vertically aligned, or between 20-60 degrees), and for PM, all the alignment cells are horizontally aligned, meaning starting from 0 degrees to 360 degrees and beyond.

It shall be noted, throughput the description herein, that an alignment layer is used as a substrate to form or hold the alignment cells (or embossed microstructures). Those skilled in the art can appreciate from the description herein that the alignment cells being described may very well be incorporated into the alignment layer when it is designed or formed. To facilitate the description of the present invention, the alignment cells are assumed to be formed on top of an alignment layer.

According to one embodiment of the present invention, the two differently aligned cells are arranged in such a way 806 that their alignments alternate across the entire alignment layer, namely the alignment of each cell is different from that of its neighboring cells. In other words, the alignments of the cells are alternating from AM to PM. In operation, both AM and PM happen simultaneously when a light goes through these cells and the LC layer is applied with proper voltages or currents. One of the advantages, benefits and objectives in the present invention is to have both AM and PM happen at the same time in an SLM device (e.g., LCoS panel). As all of the light is simultaneously modulated in phase and amplitude, a holographic image reproduced from such an implementation can be in high resolution with high efficiency.

Figure 8D:
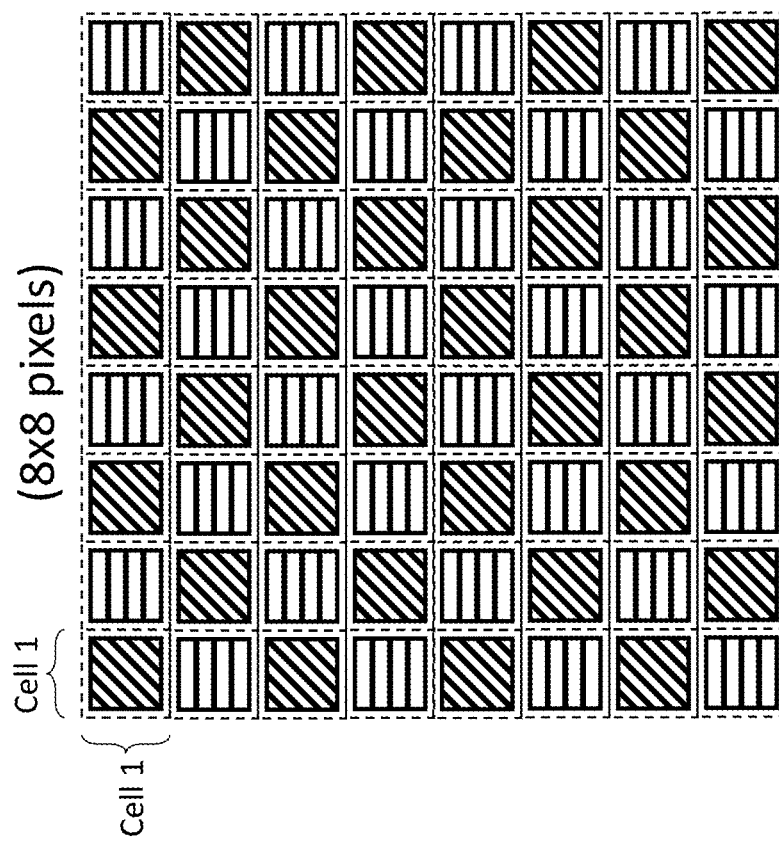
FIG. 8D shows an exemplary 8×8 array of alignment cells (, each corresponding to one pixel.

FIG. 8D shows an exemplary 8×8 array of alignment cells, each corresponding to one pixel. According to one embodiment shown in FIG. 8D, the alignment cells for AM and PM are alternating across an entire SLM device, namely alternating pixels in odd and even row or column within one SLM device. In a perspective, one half of the pixels perform the AM and the other half of the pixels perform the PM at the same time. In some modified embodiments, the alignment cells may be randomly chosen for AM and PM or a desire pattern is designed to define certain pixels or groups of pixels for AM or PM.

Figure 8E:
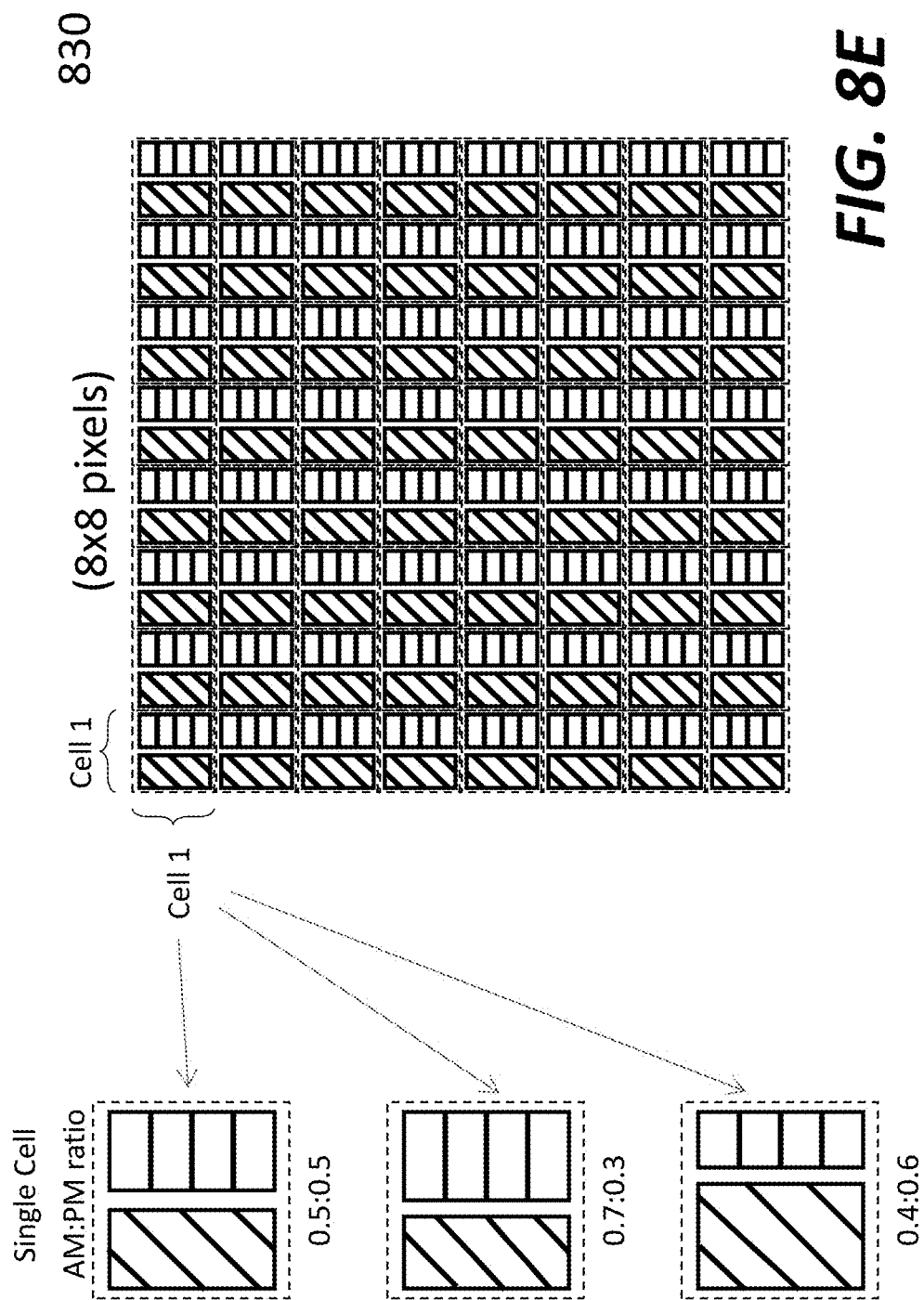
FIG. 8E shows an array of alignment cells, each of the cells designed for both AM and PM, which in operation appears to have dissected each pixel into two parts alternating across an entire SLM device, allowing one half of the pixel to perform the AM and the other half to perform PM at the same time, with different ratios of AM to PM.

According to another embodiment shown in FIG. 8E, the alignment cells for AM and PM are within one single pixel by dissecting each pixel, for example, into two parts alternating across an entire SLM device, allowing one half of the pixel to perform AM and the other half to perform PM at the same time. Depending on the implementation, the percentage of one pixel for performing AM or PM may be 50% or predefined per a desired performance, some of which are also shown in FIG. 8E.

As far as light efficiency is concerned, it is estimated according to one prior art system that the holographic display based on amplitude modulation is very low (e.g., roughly only 5%) while the efficiency is increased (e.g., to 95%) based on phase modulation. With the integrated AM and PM, the light efficiency can be considerably increased without losing the resolutions.

Figure 8G:
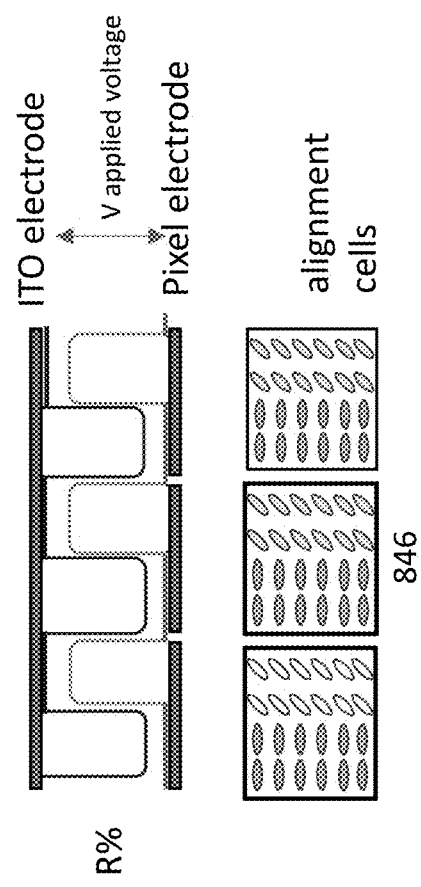
FIG. 8G shows exemplary alignment cells for the pixels of FIG. 8F, each or all can be turned, resulting in different reflectance (or transmittance in LCoS case) and phase curves as AM and PM that happen at the same time.

FIG. 8F shows two separate illustration curves 842 and 844, one being a reflectance curve 842 and the other being the phase curve. Under an appropriate electrode voltage (e.g., 0-2.5 V, 0-5 V or etc.), one half of a pixel 846 performs the AM by turning the corresponding LCs from black gradually to white or white gradually to black while the other half of the pixel 846 performs the PM by turning the corresponding LCs from 0 gradually to $2\pi$ or $2\pi$ gradually to 0. As shown in FIG. 8E, the ratio of AM and PM on a single pixel is not fixed at 50:50, but may be any numbers (e.g., 40:60 or 70:30). FIG. 8G shows the alignment cells for the pixel 846 of FIG. 8F is turned, resulting in different reflectance and phase curves, to achieve a different desired result.

Figure 8H:
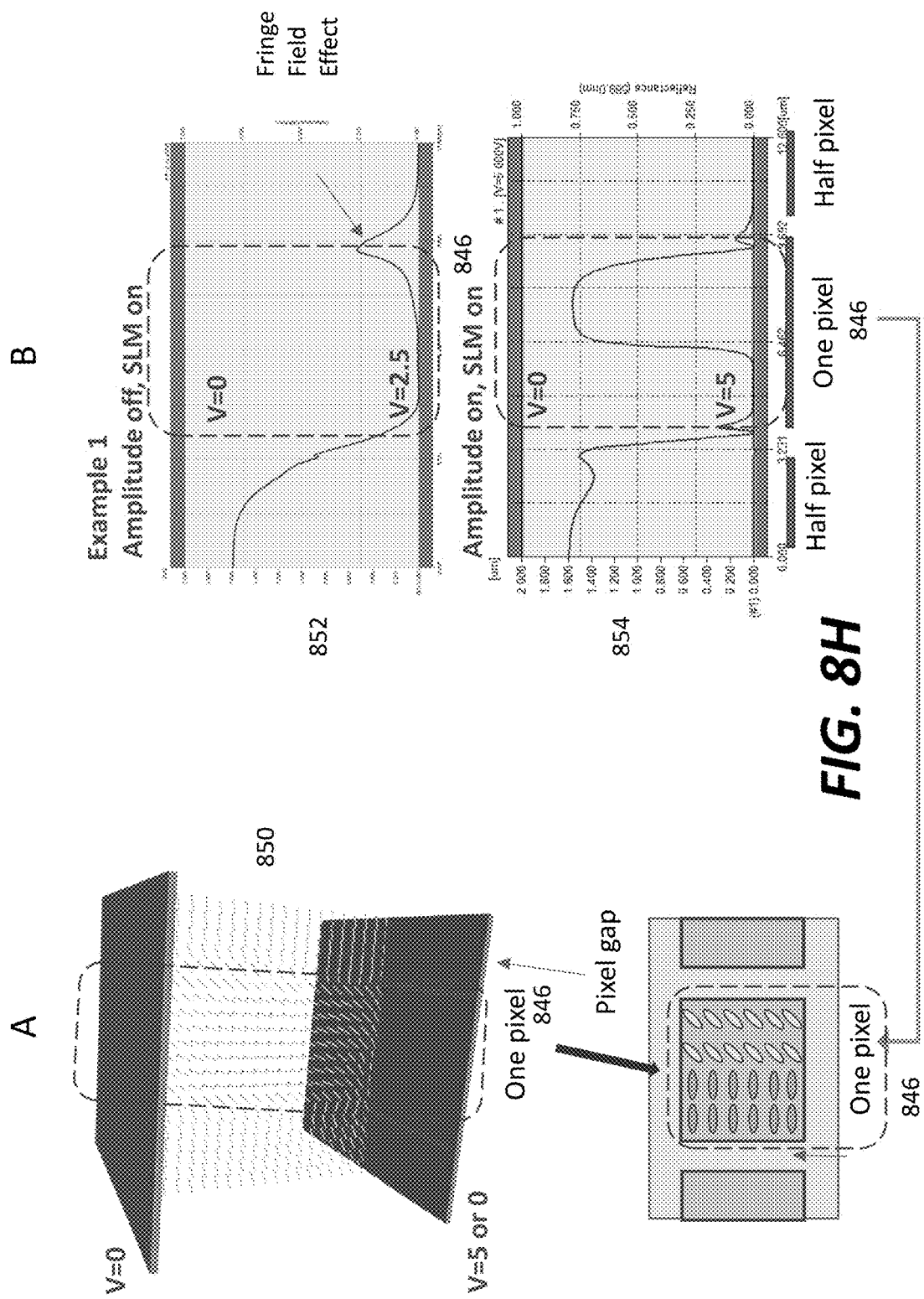
FIG. 8H shows a simulation result on a single pixel without involving the neighboring pixels.

FIG. 8H shows a simulation result on the single pixel 846 without involving the neighboring pixels. The simulation shows the liquid crystals 850 corresponding to the PM (left portion) are oriented differently from the liquid crystals corresponding to the AM (right portion) when the applied voltage is changing from 0V to 5V. It should be noted that the thickness or depth of the LC layer 850 is preferably twice as much as otherwise it is used for single modulation in one pixel. According to one embodiment, it is assumed that the depth of the LC layer 850 is great 2D, where D is the depth of an LC layer used for only AM or PM via one pixel or an array of pixels. In other words, slightly larger than this twice thickness to make sure a phase shift (0~$2\pi$) is achieved). The corresponding reflectance curve 852 and phase curve 854 are also presented with two voltages V1=0 and V2=5. The physical size of the pixel 846 is assumed that the pixel is 6.4 μm in width, thus approximately one half of 6.4 μm in width is dedicated for AM and the second half of 6.4 μm in width is dedicated for PM, if the ratio is kept to be 50:50.

Figure 8I:
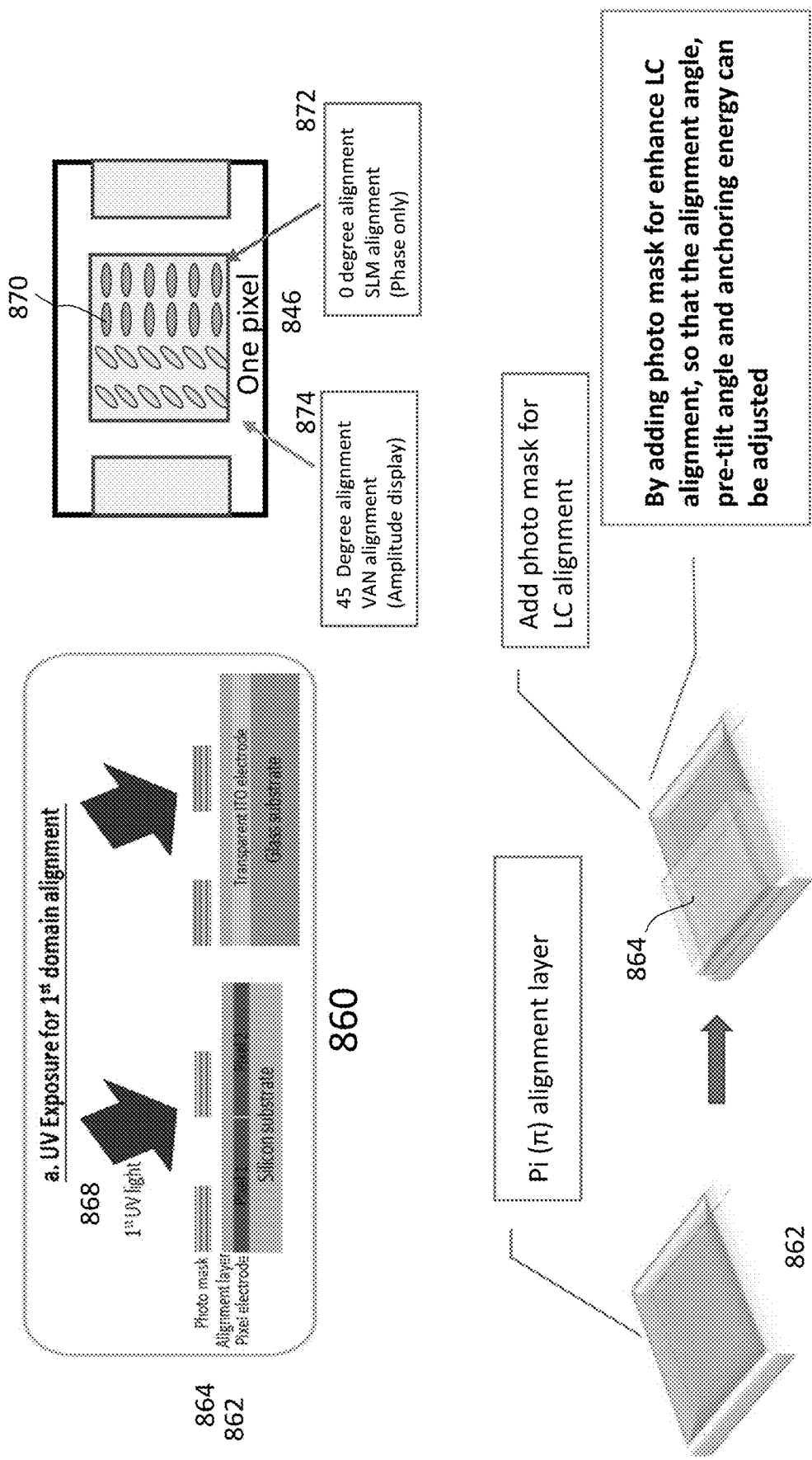
FIG. 8I shows an exemplary implementation of using a photo alignment mask method.

FIG. 8I shows an exemplary implementation 860 of using a photo alignment mask method. An alignment layer 862 is added thereon with a photo mask 864. Given a predefined pattern imprinted upon the photo mask 864, for example 50/50 for each cell, namely a cell 862 is configured to cause both of the AM and PM to take place simultaneously. The photo mask 864 is etched with UV lights or other means 868. As a result, a pixel is covered with an alignment cell 870 that has two different alignments, one 872 for the PM and the other 874 for the AM. The same pattern is etched for all the cells across the alignment layer in a single SLM device, as shown similarly in FIG. 8E. In an alternative embodiment (not shown in FIG. 8I), such an alignment cell, either horizontally aligned or diagonally aligned, covers just one pixel. All neighboring cells, each covering a single pixel, can be aligned differently. In other words, all the alignment cells are alternatively aligned either horizontally for the PM or diagonally for the AM, as shown similarly in FIG. 8D.

Figure 8J:
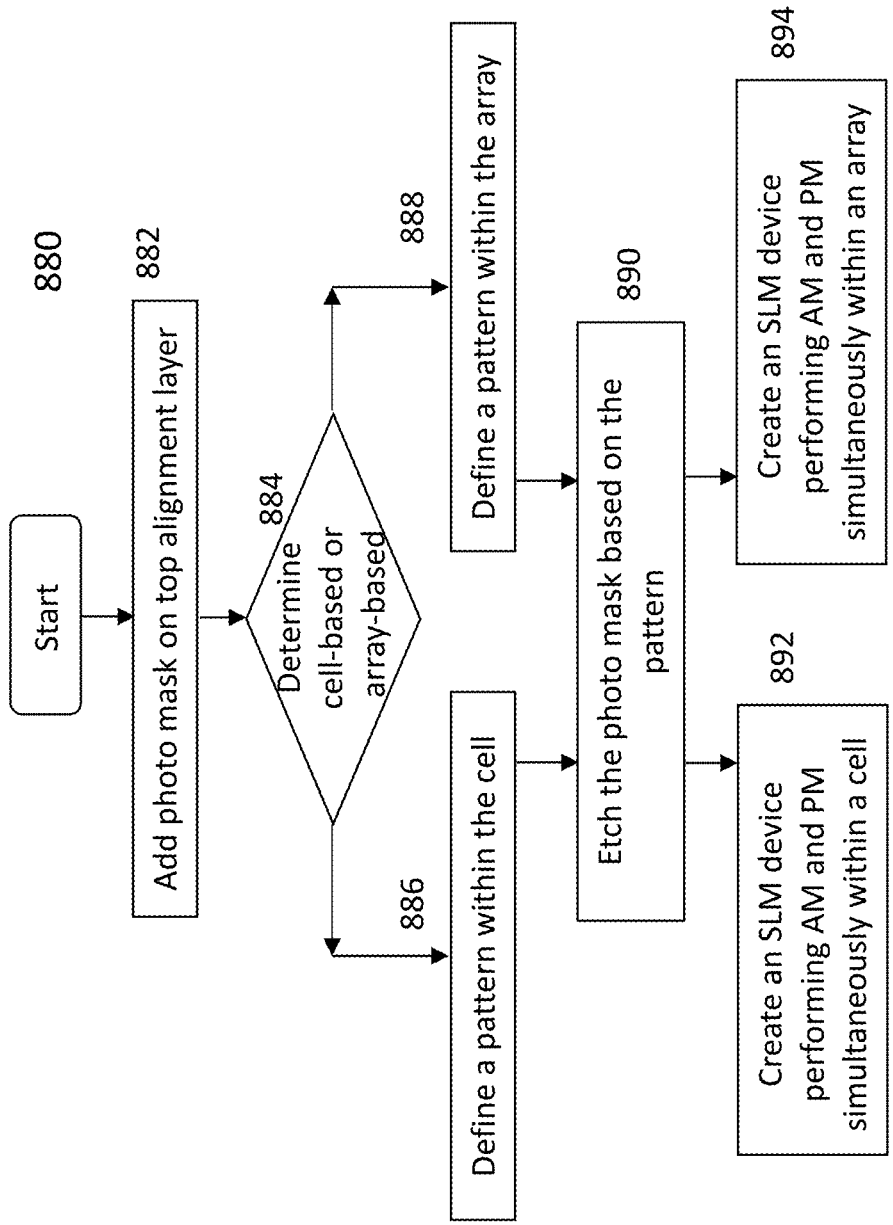
FIG. 8J shows a flowchart or process of creating an SLM device performing both AM and PM simultaneously within a cell or within an array according to one embodiment.

FIG. 8J shows a flowchart or process 880 of creating an SLM device performing both AM and PM simultaneously within a cell or within an array according to one embodiment. The process 880 may be better understood in conjunction with the figures above. The process 880 starts when an implementation of adding a photo mask on top of an alignment layer.

An SLM device, such as LCoS, includes an LC layer to control the pass of the reflected (or transmitted) light. As described above, one embodiment is to modify or add an alignment layer on top of the LC layer. Depending on the resolution of the SLM, there are a plurality of alignment cells, each responsible for a pixel. These cells need to be controlled uniquely to facilitate the LCs in the LC layer to modulate the reflected light in amplitude and phase, given the characteristics of the underlying LCs.

At 882, a photo mask is laid over the alignment layer. As described above with respect to FIG. 8D and 8E, there are two ways to have the AM and PM occur at the same in a single SLM device, one being within a cell and the other within an array of cells. To facilitate the description of these two embodiments, the term "cell-based simultaneous modulations" indicates that the AM and PM are performed within a cell at the same time, namely an alignment cell is partitioned to have two parts, one for the AM and the other for the PM and the same is repeated across the entire array of cells in a single SLM device. The term "array-based simultaneous modulations" indicates that all the cells are alternatively designated to perform the AM or PM, namely no neighboring alignment cells performing the same modulations.

At 884, the process 880 determines how to design or configure the photo mask via print or lithography. If it is decided to have the cell-based simultaneous modulations, the process 880 goes to 886, where a corresponding pattern can be printed on the photo mask. According to one embodiment, all the cells shall have the same pattern across the array. According to another embodiment, all the cells in a row have the same pattern across the row while the neighboring rows have a half-pixel shift pattern in view of FIG. 8E, resulting in two alternating patterns across the rows. If it is decided to have the array-based simultaneous modulations, the process 880 goes to 888, where a corresponding pattern can be printed on the photo mask. The pattern dictates that every other cell is designated to perform one modulation (e.g., the AM) and every another cell is designated to perform another modulation (e.g., the PM). FIG. 8D shows an exemplary portion of such a pattern.

The pattern may be varying depending on what performance is being desired. In general, the ratio of the AM and PM within one cell is 50/50, but the ratio of the AM and the PM may be adjusted to any number if desired. Once the pattern is decided, the pattern may be imprinted onto the photo mask. The detail of making or imprinting a pattern onto a photo mask is not to be further described herein as it is well known in the art (e.g., in semiconductor manufacturing). The process 880 now goes to 890, where the photo mask is etched. There are many ways to etch a photo mask. Again, the detail of etching a photo mask is not to be further described herein as it is well known in the art (e.g., in semiconductor manufacturing). As a result of the alignment layer with the designated aligned cells, an SLM device performing the AM and the PM simultaneously within a cell is created at 892 or an SLM device performing the AM and the PM simultaneously within an array is created at 894.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display device comprises:
    an eyeglasses frame;
    at least one integrated, wherein the integrated lens is framed in the eyeglasses frame;
    a spatial light modulation (SLM) device provided to modulate an optical image in both amplitude and phase to produce a modulated image; and
    at least a hologram mirror receiving the modulated image in parallel to the integrated lens, and turning the modulated image by 90 degrees to project the modulated image into the integrated lens, wherein the hologram mirror is optically coated to selectively allow certain wavelengths to pass through and reflect, a hologram resulting from the modulated image is seen in the integrated lens by a user wearing the display device.

2. The display device as recited in claim 1, further comprising a light source to shine the SLM device, wherein the hologram is a reflected light from the SLM device.

3. The display device as recited in claim 2, wherein the light source is a uniform laser light sheet, and the SLM device includes a microdisplay shined by the uniform laser light sheet.

4. The display device as recited in claim 2, wherein the ;SLM;
    device includes a first group of pixels performing amplitude modulation (AM); and
    a second group of pixels performing phase modulation (PM), wherein the first group of pixels and the second group of pixels are within a single array, both of the AM and the PM are performed via a layer of liquid crystals sandwiched between a transparent electrode layer and a reflecting electrode layer, where the reflecting electrode comprises an array of pixel electrodes, each controlling one of the pixels, and is built on a silicon substrate.

5. The display device as recited in claim 4, wherein the SLM device further includes the first group of pixels interlace the second group of pixels across the single array.

6. The display device as recited in claim 5, wherein the SLM device further includes a photo mask on top of an alignment layer deposed on the layer of liquid crystals, wherein the photo mask has a pattern including an array of alignment cells, each corresponding to one of the pixels, wherein a first group of the alignment cells are aligned in a first direction and a second group of the alignment cells are aligned in a second direction.

7. The display device as recited in claim 6, wherein the first group of the alignment cells interlace the second group of the alignment cells in the photo mask across the alignment layer.

8. The display device as recited in claim 6, wherein the first group of the alignment cells cause light modulated in phase while the second group of the alignment cells cause light modulated in amplitude.

9. The display device as recited in claim 2, wherein the image source is located next to the temple and projects the hologram into the edge of the waveguide.

10. The display device as recited in claim 2, wherein the image source is an end of a plurality of optical fibers, the optical fibers are encapsulated in or integrated with the temple.

11. The display device as recited in claim 10, wherein the optical fibers are part of the temple.

12. The display device as recited in claim 10, wherein the optical fibers have another end receiving a sequence of optical images projected thereon from a lens deposed before the SLM device.

13. The display device as recited in claim 12, wherein the optical fibers extend beyond the temple.

14. The display device as recited in claim 1, wherein data image to generate the optical images are at first refresh rate and in first resolution, two of the optical images are successively displayed in the integrated lens, resulting in a combined optical image at second refresh rate and in second resolution.

15. The display device as recited in claim 14, wherein the first refresh rate=2x the second refresh rate, and the first resolution=½x the second resolution.

16. The display device as recited in claim 15, wherein two successive optical images from the optical fibers are to produce the combined optical image perceived by a viewer of the display device.

17. A method for a display device, the method comprises:
    providing an eyeglasses frame including at least one integrated lens and one temple attached to the eyeglasses frame;
    receiving an optical image;
    modulating the optical image in amplitude and phase in a spatial light modulation (SLM) device;
    generating a hologram from light intensities reflected from the SLM device being shined by a uniform light sheet; and
    project the hologram by 90 degrees via a mirror into the integrated lens, wherein the mirror is optically coated to selectively allow certain wavelengths to pass through or reflect, and the hologram is subsequently seen in the integrated lens by a user wearing the display device.

18. The method as recited in claim 17, wherein the SLM device includes a microdisplay, the method further comprising:
  shining the uniform laser light sheet onto the microdisplay, and modulating the optical image from the uniform laser light sheet in both amplitude and phase.

19. The method as recited in claim 18, wherein the device includes a first group of pixels performing amplitude modulation (AM); and a second group of pixels performing phase modulation (PM), wherein the first group of pixels and the second group of pixels are within a single array, both of the AM and the PM are performed via a layer of liquid crystals sandwiched between a transparent electrode layer and a reflecting electrode layer, where the reflecting electrode comprises an array of pixel electrodes, each controlling one of the pixels, and is built on a silicon substrate.

20. The method as recited in claim 19, wherein the SLM device further includes the first group of pixels interlace the second group of pixels across the single array.

* * * * *